US008791965B2

(12) United States Patent
Matsumoto

(10) Patent No.: US 8,791,965 B2
(45) Date of Patent: Jul. 29, 2014

(54) CONVERSION CIRCUIT, DISPLAY DRIVE CIRCUIT, ELECTRO-OPTICAL DEVICE AND ELECTRONIC EQUIPMENT

(75) Inventor: Tetsuro Matsumoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1014 days.

(21) Appl. No.: 12/859,375

(22) Filed: Aug. 19, 2010

(65) Prior Publication Data

US 2011/0043546 A1 Feb. 24, 2011

(30) Foreign Application Priority Data

Aug. 24, 2009 (JP) ................................ 2009-193524

(51) Int. Cl.

*G09G 5/10* (2006.01)
*G09G 3/28* (2013.01)
*G09G 3/36* (2006.01)
*G06F 3/038* (2013.01)

(52) U.S. Cl.

USPC ................ 345/690; 345/60; 345/94; 345/204

(58) Field of Classification Search

CPC .................... G09G 3/2022; G09G 2320/0266; G09G 2360/16; G09G 2320/0271; G09G 3/28; G09G 3/2803; G09G 2320/0233; G09G 3/2033; G09G 3/3225; G09G 5/395; H04N 2005/7466

USPC ................... 345/603–605, 690; 348/441–459

See application file for complete search history.

(56) References Cited

U.S. PATENT DOCUMENTS

| | | | | |
|---|---|---|---|---|
| 6,144,356 | A | 11/2000 | Weatherford et al. | |
| 7,518,622 | B2 | 4/2009 | Ochi | |
| 2002/0135604 | A1 | 9/2002 | Yoneyama | |
| 2004/0145597 | A1 | 7/2004 | Ito | |
| 2005/0206601 | A1 * | 9/2005 | Aoki | 345/94 |
| 2008/0062075 | A1 * | 3/2008 | Seo et al. | 345/60 |

FOREIGN PATENT DOCUMENTS

| | | |
|---|---|---|
| JP | A-06-180558 | 6/1994 |
| JP | A-09-006285 | 1/1997 |
| JP | A 2001-209346 | 8/2001 |
| JP | A-2002-189455 | 7/2002 |
| JP | A-2002-328665 | 11/2002 |
| JP | A-2002-537569 | 11/2002 |
| JP | A-2004-233522 | 8/2004 |
| JP | A-2006-146172 | 6/2006 |
| JP | A 2006-215534 | 8/2006 |
| JP | A-2009-008880 | 1/2009 |

* cited by examiner

*Primary Examiner* — Dwayne Bost
*Assistant Examiner* — Scott Trandai
(74) *Attorney, Agent, or Firm* — Oliff PLC

(57) ABSTRACT

A display drive circuit that performs digital driving for displaying an image of each one frame based on luminance data of a plurality of subframes is disclosed. The display drive circuit includes a conversion section that converts the luminance data having a plurality of bits indicating a luminance level of each of the plurality of subframes into data indicating the luminance level for pixels in a number greater than the number of the plurality of subframes, and a storage section that stores the data converted by the conversion section.

7 Claims, 13 Drawing Sheets

| Address | Digital code |
|---|---|
| 0x000 | 0x000000000000 |
| 0x001 | 0x000000000001 |
| 0x002 | 0x000000000003 |
| 0x003 | 0x00000000000E |
| 0x004 | 0x000000000101 |
| 0x005 | 0x00000000010C |
| ⋮ | ⋮ |
| 0xFFF | 0xFFFFFF000000 |

CONVERSION CIRCUIT, DISPLAY DRIVE CIRCUIT, ELECTRO-OPTICAL DEVICE AND ELECTRONIC EQUIPMENT

The present application claims a priority based on Japanese Patent Application No. 2009-193524 filed on Aug. 24, 2009, the contents of which are incorporated herein by reference.

BACKGROUND

1. Technical Field

The present invention relates to a conversion circuit that converts data to be used for image display, a display drive circuit equipped with the conversion circuit, an electro-optical device equipped with the display drive circuit, and electronic equipment equipped with the electro-optical device.

2. Related Art

It is commonly known that an electro-optical device is equipped with a plurality of scanning electrodes (scanning lines), a plurality of signal electrodes (data lines) and a plurality of pixels provided at position where these scanning electrodes and the signal electrodes intersect one another, wherein a gradation signal (image data) corresponding to the gradation of each pixel is supplied to each of the pixels corresponding to selected ones of the scanning electrodes through the signal electrodes, thereby changing the optical state of each of the pixels. Such electro-optical devices are used not only in stationary type electronic equipment, such as, projectors, TVs and the like, but also in a variety of portable type electronic equipment.

In recent years, many electro-optical devices use the digital drive method in which a plurality of gradation levels is expressed in image display through dividing each frame into a plurality of subframes using digitized image data. Japanese Laid-open Patent Application 2006-215534 (Patent Document 1) describes a technology to increase the number of expressible gradations without increasing the number of subframes in each one frame. Also, Japanese Laid-open Patent Application 2001-209346 (Patent Document 2) describes a technology to display many gradations without using particularly high-speed circuit elements.

As the number of gradations increases as the resolution becomes higher, the data amount of image data to be handled becomes substantially large, such that the image data needs to be processed at high speed. To process such a huge amount of image data at high speed, it is necessary not only to prepare high-speed circuit elements to process the image data but also to newly prepare a high speed data bus, which can lead to a problem of an increased circuit scale.

Also, as the electro-optical device that uses the digital drive method described above achieves higher resolutions with an increase in the number of subframes, its operation speed could reach several ten times the operation speed of an electro-optical device that uses a conventional analog drive method (a method of driving without a subframe dividing scheme). This would make the operation speed extremely high, which could reach several GHz, and lead to problems, such as, increased difficulty in designing, higher power consumption, and the like.

SUMMARY

In accordance with an advantage of some aspects of the invention, it is possible to provide conversion circuits, display drive circuits and electro-optical devices which are capable of realizing high-definition display without causing a substantial increase in the circuit scale or an increase in the operation speed, and electronic equipment equipped with the electro-optical device.

A display drive circuit in accordance with an embodiment of the invention pertains to a display drive circuit that performs digital driving for displaying an image of each one frame based on luminance data of a plurality of subframes, and includes a conversion section that converts the luminance data having a plurality of bits indicating a luminance level of each of the plurality of subframes into data indicating the luminance level for pixels in a number greater than the number of the plurality of subframes, and a storage section that stores the data converted by the conversion section.

According to the embodiment described above, the luminance data having a plurality of bits indicating a luminance level of each of the plurality of subframes is converted into data indicating the luminance level for pixels in a number greater than the number of the plurality of subframes and stored. As a result, the data converted by the conversion section can be stored in the storage section at a rate lower than the transfer rate of transferring the luminance data, such that high definition display can be realized without causing a substantial increase in the circuit scale or an increase in the operation speed.

Also, the display drive circuit in accordance with an aspect of the embodiment of the invention is further equipped with a generation section that generates, based on gradation data, the luminance data having a plurality of bits indicating a luminance level of each of the plurality of subframes for each of the pixels.

Also, in the display drive circuit in accordance with an aspect of the embodiment of the invention, the generation section is equipped with a nonvolatile memory having addresses corresponding to the gradation data, wherein data stored in storage regions specified by the addresses correspond to data composed of a plurality of bits indicating the luminance level of each of the subframes.

According to the embodiment describe above, the data stored in the storage regions specified by the addresses corresponding to the gradation data are data composed of a plurality of bits indicating the luminance level of each of the subframes, such that data composed of a plurality of bits indicating the luminance level of each of the subframes can be generated at high speed with a relatively simple structure.

Also, in the display drive circuit in accordance with an aspect of the embodiment of the invention, the conversion section converts data generated by the generation section into data composed of bits indicating the luminance level of the same subframe in the unit of pixels in the number of phase expansion in the arrangement order of the pixels.

Also, in the display drive circuit in accordance with an aspect of the embodiment of the invention, the conversion section is equipped with a plurality of conversion circuits that alternately perform input of data generated by the generation section and output of converted data.

According to this aspect of the embodiment, input of data generated by the generation section and output of converted data are alternately performed by the plurality of conversion circuits, such that data generated by the generation section can be continuously converted.

Also, in the display drive circuit in accordance with an aspect of the embodiment of the invention, the conversion circuit includes a plurality of shift registers that operate in synchronism with each other, and each having an input terminal in which each bit value of the data generated by the generation section is inputted, and output terminals in a number of bits of data to be outputted, and a plurality of selectors, each having input terminals in the number of bits of data generated by the generation section wherein the input terminals are connected to those of the output terminals with identical shift stage numbers among the output terminals of the plurality of shift registers, respectively, and a counter that controls data to be selected by the plurality of selectors.

Also, in the display drive circuit in accordance with an aspect of the embodiment of the invention, the storage section is equipped with a plurality of storage circuits each capable of storing data for one frame converted by the conversion section.

Furthermore, the display drive circuit in accordance with an aspect of the embodiment of the invention may be equipped with a write control section that writes data outputted from the conversion circuit to the storage section in synchronism with a dot clock that is a unit for driving the pixels.

A conversion circuit in accordance with an embodiment of the invention pertains to a conversion circuit provided for a display drive circuit that performs digital driving for expressing a plurality of gradients through dividing one frame into a plurality of subframes for displaying an image, wherein data composed of a plurality of bits for each pixel, indicating a luminance level of each of the subframes, is converted into data composed of bits indicating the luminance level of the same subframe in the unit of pixels in a predetermined number greater than the number of the subframes, and outputted.

According to this embodiment, data composed of a plurality of bits for each pixel, indicating a luminance level of each of the subframes, is converted into data composed of bits indicating the luminance level of the same subframe in the unit of pixels in a predetermined number greater than the number of the subframes, such that data can be outputted at a lower rate than that of inputted data. For this reason, high definition display can be realized without causing a substantial increase in the circuit scale or an increase in the operation speed.

In the conversion circuit in accordance with an aspect of the embodiment of the invention, the pixels in the predetermined number are pixels in the number of phase expansion in the arrangement order of the pixels.

An electro-optical device in accordance with an embodiment of the invention pertains to an electro-optical device having pixels formed from switching elements provided according to intersections between a plurality of scanning lines and a plurality of data lines, and pixel electrodes connected to the switching elements, wherein the electro-optical device is equipped with any one of the display drive circuits described above that drives the pixels based on data stored in the storage section.

Further, an electronic apparatus in accordance with an embodiment of the invention is equipped with the electro-optical device described above.

DESCRIPTION OF EXEMPLARY EMBODIMENTS

A conversion circuit, a display drive circuit, an electro-optical device and an electronic apparatus in accordance with embodiments of the invention are described in detail below with reference to the accompanying drawings. It is noted that the embodiments to be described below are only some parts of modes of the invention, and do not limit the invention, and can be arbitrarily changed within the range of the technological concept of the invention.

Figure 1:
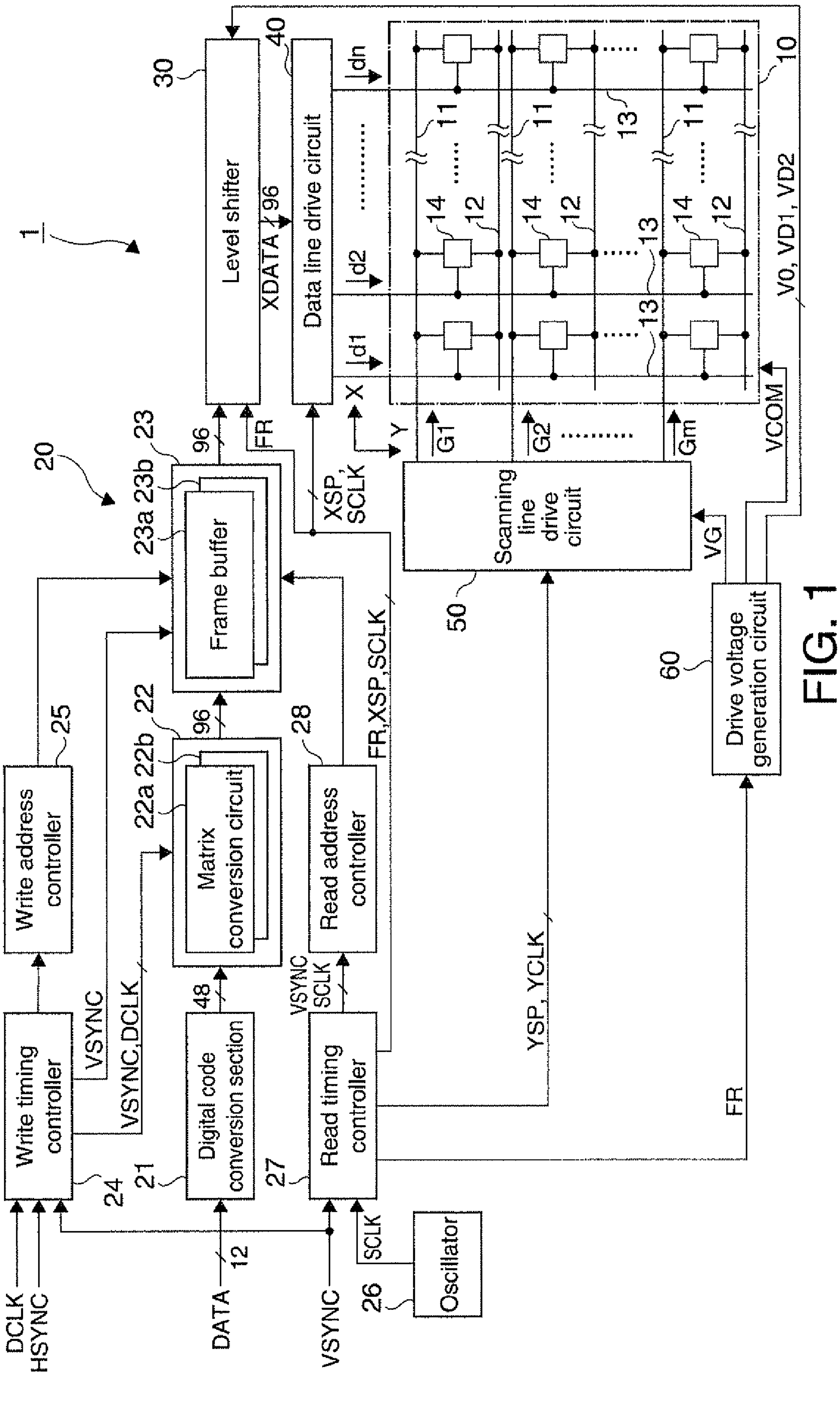
FIG. 1 is a block diagram showing the structure of a main portion of an electro-optical device in accordance with an embodiment of the invention.

FIG. 1 is a block diagram showing a composition of a main portion of an electro-optical device in accordance with an embodiment of the invention. The electro-optical device will be described, using a liquid crystal device as an example. As shown in FIG. 1, a liquid crystal device 1 is equipped with a liquid crystal panel 10, a display drive circuit 20, a level shifter 30, a data line drive circuit 40, a scanning line drive circuit 50, and a drive voltage generation circuit 60, wherein the drive circuit such as the display drive circuit 20 and the like drives the liquid crystal panel 10 by the control of a control circuit (not shown).

The liquid crystal device 1 in accordance with the present embodiment is assumed to use digital driving (digital time-division driving) as a gradation display system in which one frame is divided into a plurality of subframes, and a luminance level of pixels in each of the subframes is set at least first level or second level thereby expressing a plurality of gradations, and use common inversion driving as an AC driving method. It is noted that, in accordance with the present embodiment, the number of subframes is "48." Also, the display mode of the liquid crystal device 1 is a normally white mode, wherein black display (at the first level with a luminance level being 0) is performed when a voltage is applied to the pixel, and white display (at the second level with a luminance level other than 0) is performed when a voltage is not applied to the pixel.

The liquid crystal panel 10 is formed with an element substrate and a counter substrate bonded with each other with a predetermined gap provided therebetween, and liquid crystal that is an electro-optical material held in the gap. The liquid crystal panel 10 has m number of (m is an integer of 2 or more) scanning lines 11 and holding capacity lines 12 extending in an X direction, which are arranged and formed in a Y direction, and n number of (n is an integer of 2 or more) data lines 13 extending in the Y direction, which are arranged and formed in the X direction. Also, a plurality of pixels 14 are arranged in a matrix of m rows×n columns at positions corresponding to the intersections between the scanning lines 11 and the data lines 13, respectively. It is noted that, in the present embodiment, m=1080 and n=1920.

Figures 2, 3:
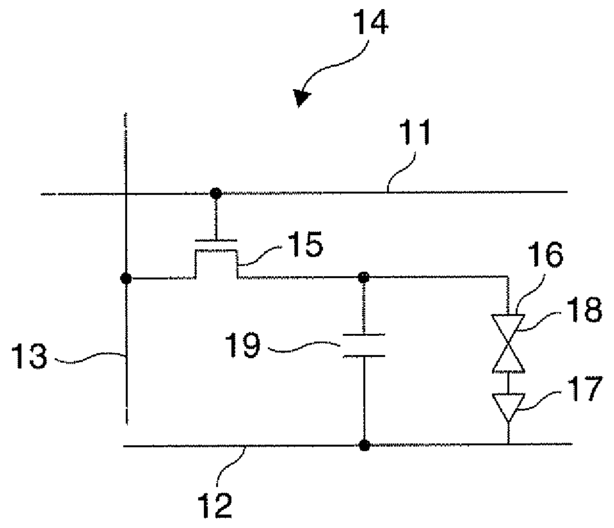
FIG. 2 is a circuit diagram of a concrete composition example of a pixel 14.
FIG. 3 is a figure showing an example of a nonvolatile memory provided in a digital code conversion section 21.

FIG. 2 is a circuit diagram of a concrete composition example of the pixel 14. As shown in FIG. 2, the pixel 14 is formed from a transistor (MOSFET) 15 that is a switching element, a pixel electrode 16, a counter electrode (a common electrode) 17, liquid crystal 18, and a holding capacitance 19. The transistor 15 has a gate, a source and a drain that are connected to the scanning line 11, the data line 13 and the pixel electrode 16, respectively. Also, the liquid crystal 18 is held between the pixel electrode 16 and the counter electrode (common electrode) 17 thereby forming a liquid crystal layer.

The counter electrode 17 is a transparent electrode that is formed over the entire surface of the counter substrate in a manner to be opposite the pixel electrode 16. Also, the holding capacitance 19 is formed between the pixel electrode 16 and the holding capacitance line 12, and supplementarily stores electric charge with the electrodes (the pixel electrode 16 and the counter electrode 17) that hold the liquid crystal layer. It is noted that a common voltage VCOM is supplied to the counter electrode 17 and the holding capacitance line 12 from the drive voltage generation circuit 60 (see FIG. 1).

Scanning signals G1, G2, . . . , Gm are supplied to the scanning lines 11 by the scanning line drive circuit 50, respectively. The transistors 15 composing the pixels 14 connected to each of the scanning lines 11 are turned on by the respective scanning signals G1, G2, . . . , Gm, whereby data signals d1, d2, . . . , dn supplied from the data line drive circuit 40 to the respective data lines 13 are supplied to the pixel electrodes 16, and written in the liquid crystals 18 and the holding capacitances 19. As the present embodiment uses the digital driving as described above, each of the data signals d1, d2, . . . , dn is a binary voltage corresponding to either a first level (black) or a second level (white). In this manner, the molecular orientation state of the liquid crystal 18 changes according to the voltage written in the pixel 14, in other words, a potential difference between the pixel electrode 16 and the counter electrode 17, whereby the visible light is modulated.

The display drive circuit 20 is equipped with a digital code conversion section 21 (a generation section), a matrix conversion section 22 (a conversion section), a frame buffer section 23 (a storage section), a write timing controller 24, a write address controller 25 (a write control section), an oscillator 26, a read timing controller 27, and a read address controller 28. The display drive circuit 20 having the structure described above receives inputs of image data DATA, dot clock signal DCLK, vertical synchronization signal VSYNC, and horizontal synchronization signal HSYNC, outputted from a control circuit (not shown), and generates data for image display (display data) to the liquid crystal panel 10 based on these signals.

Here, the image data DATA is data (gradation data) indicating a gradation of each of the pixels 14 in one frame. In the following description, the number of bits of the image data DATA is assumed to be 12 bits, whereby 4,096 gradations can be expressed. Also, the dot clock signal DCLK is a signal that defines the transfer rate of the image data DATA (the transfer timing of the image data DATA for each pixel), the vertical synchronization signal VSYNC is a signal that defines the start timing of each frame, and the horizontal synchronization signal HSYNC is a signal that defines the start timing of each horizontal scanning period.

In the present embodiment, as the number of frames for one second is "60," the frequency of the vertical synchronization signal VSYNC is 60 Hz, and as the number of scanning lines 11 is "1,080," the frequency of the horizontal synchronization signal HSYNC is 64.8 kHz (1,080×60 Hz). Also, as the number of the data lines 13 is "1,920," the frequency of the dot clock signal DCLK is about 124 MHz (1,920×1,080×60 Hz).

The digital code conversion section 21 generates data composed of a plurality of bits for each pixel indicating a luminance level for each of the subframes (hereafter referred to as a digital code), based on the inputted image data DATA. The digital code conversion section 21 has addresses corresponding to gradations, as shown in FIG. 3. The digital code conversion section 21 is equipped with a nonvolatile memory such as a ROM (Read Only Memory) whose data stored in memory regions to be specified by the addresses are the digital codes, and converts the image data DATA to digital codes, using the nonvolatile memory.

FIG. 3 is a figure showing an example of the nonvolatile memory provided at the digital code conversion section 21. As shown in FIG. 3, the nonvolatile memory has addresses (0×000~0XFFF) for 12 bits, in the same number of bits of the image data DATA, and each of the addresses is correlated with each of the gradations (0~4,095) of the image data DATA. For example, in FIG. 3, a gradation "5" is correlated with an address 0×005. It is noted that, for the sake of simplicity of the description, an example in which the nonvolatile memory has addresses in the same number of bits as that of the image data DATA is described. However, the nonvolatile memory may have addresses in a bit number more than the number of bits of the image data DATA.

Also, the storage regions specified by the respective addresses store digital codes for gradients correlated to the corresponding addresses, respectively. For example, in FIG. 3, the storage region specified by the address 0×005 corresponding to the gradient "5" stores a 48-bit digital code of 0×00000000010C. It is noted that the digital codes shown in FIG. 3 are only examples, and digital codes to be stored in the nonvolatile memory are appropriately decided according to the characteristics of the liquid crystal panel 10.

The number of bits of each digital code to be outputted from the digital code conversion section 21 is decided according to the number of subframes. In accordance with the present embodiment, the number of subframes is "48," and therefore 48-bit digital codes are used. Image data DATA of 1,920×1,080 pixels for 60 frames is inputted in one second in the digital code conversion section 21 in synchronism with the dot clock signal DCLK described above, such that the operation frequency of the digital code conversion section 21 is about 124 MHz (1,920×1,080×60 Hz).

The matrix conversion section 22 is equipped with matrix conversion circuits 22*a* and 22*b* (conversion circuits), a counter and a frequency divider (illustration of the counter and the frequency divider is omitted), for converting digital codes outputted from the digital code conversion section 21 into data in a predetermined format (display data). More specifically, the matrix conversion section 22 converts digital codes each being data for each pixel composed of a plurality of bits indicating a luminance level for each of the subframes into data composed of bits indicating the luminance level of the same subframe in the unit of pixels in the number of phase expansion in phase expansion driving that is performed by the data line drive circuit 40. Such a conversion process is performed mainly to suppress an increase in the operation frequency of the display drive circuit 20 that performs digital driving, without causing a substantial increase in the circuit scale.

The phase expansion driving is a driving method for lowering the frequency of writing data signals to the pixels 14

(i.e., the frequency $f_{SCLK}$ of the system clock signal SCLK to be described below), which is a driving method of sequentially writing data in the unit of the number of phase expansion to each of the scanning lines 11. For example, when 1,920 pixels are connected to one scanning line 11, and the number of phase expansion is "96," writing operations are performed only 20 times in one horizontal scanning period. In contrast, when phase expansion driving is not performed, writing operations are required 1,920 times in one horizontal scanning period. Accordingly, the write frequency ($f_{SCLK}$) can be drastically lowered by performing the phase expansion driving.

The matrix conversion section 22 performs the conversion process while switching between the matrix conversion circuits 22*a* and 22*b*, each time digital codes in the number of phase expansion are outputted from the digital code conversion section 21. The switching operation is performed to realize continuous conversions of digital codes by alternately performing reading of digital codes outputted from the digital code conversion section 21 and outputting converted data between the matrix conversion circuits 22*a* and 22*b*.

More specifically, the matrix conversion section 22 counts the dot clock signal DCLK outputted from the write timing controller 24 by using an unshown counter, and switches between the matrix conversion circuits 22*a* and 22*b* each time the count value reaches a multiple of the number of phase expansion. Therefore, the frequency of switching between the matrix conversion circuits 22*a* and 22*b* is 1.296 MHz that is obtained by dividing the frequency of the dot clock signal DCLK by the number of phase expansion (1,920×1,080×60/96 Hz). It is noted that the count value of the counter is reset each time the vertical synchronization signal VSYNC outputted from the write timing controller 24 is inputted.

Figure 4:
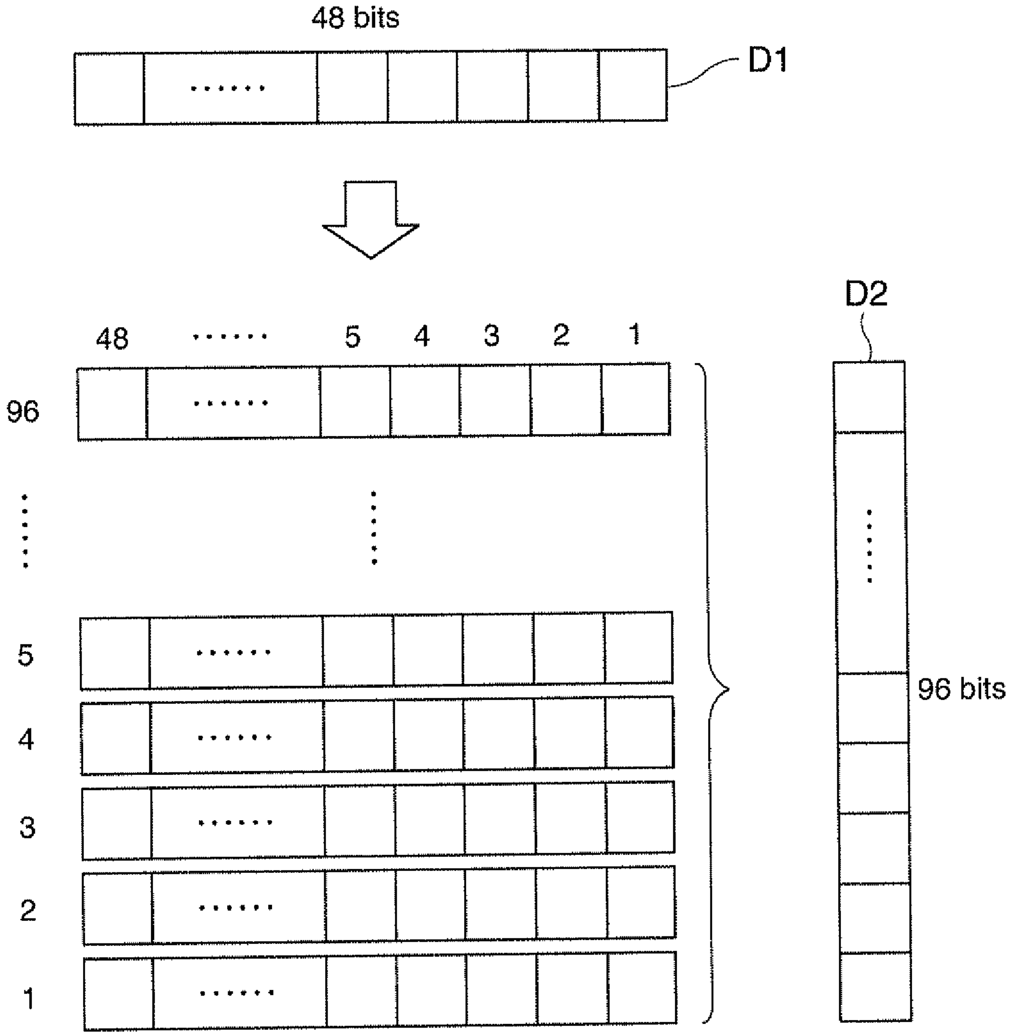
FIG. 4 is a diagram for explaining the processing performed by matrix conversion circuits 22*a* and 22*b*.

FIG. 4 is a figure for explaining the process performed by the matrix conversion circuits 22*a* and 22*b*. Here, the process executed by the matrix conversion circuit 22*a* is described as an example. In FIG. 4, 48-bit data appended with a mark D1 is a digital code outputted from the digital code conversion section 21, and 96-bit data appended with a mark D2 is data that is converted by the matrix conversion circuit 22*a*. It is noted that the number of bits of the digital code D1 is the same as the number of subframes, and the number of bits of the data D2 is the same as the number of phase expansion.

As shown in FIG. 4, the matrix conversion circuit 22*a* accumulates digital codes D1 in the same number as the number of phase expansion, i.e., 96 digital codes outputted from the digital code conversion section 21 in the order of their outputs, then sequentially takes 96 bits at each bit position from the accumulated data from the first bit through the 48$^{th}$ bit thereby converting them into the data D2, and sequentially outputs the data D2. In other words, the matrix conversion circuit 22*a* sequentially outputs 96-bit data collecting only the first bits among the accumulated 96 data, 96-bit data collecting only the second bits, . . . , 96-bit data collecting only the 48$^{th}$ bits.

It is noted that, during the period from the completion of accumulation (writing) of the 96 digital codes D1 outputted from the digital code conversion section 21 until all the accumulated data are outputted as the data D2, new digital codes D1 cannot be stored in the matrix conversion circuit 22*a*. For this reason, in accordance with the present embodiment, the matrix conversion circuit 22*b* is provided, in addition to the matrix conversion circuit 22*a*, such that, while data D2 are outputted from the matrix conversion circuit 22*a*, digital codes D1 are accumulated in the matrix conversion circuit 22*b* and, in reverse, while data D2 are outputted from the matrix conversion circuit 22*b*, digital codes D1 are accumulated in the matrix conversion circuit 22*a*, whereby continuous conversion is realized.

It is noted that 48-bit digital codes outputted from the digital code conversion section 21 whose operation frequency is about 124 MHz are inputted in the matrix conversion section 22. On the other hand, digital codes inputted in the matrix conversion section 22 are converted, and outputted as 96-bit data. For this reason, the operation frequency (the frequency of the write clock) on the input side of the matrix conversion section 22 (the matrix conversion circuits 22*a* and 22*b*) is about 124 MHz which is the same as the operation frequency of the digital code conversion section 21, but the operation frequency on the output side thereof (the frequency of the read clock) is about 62.2 MHz (1,920×1,080×60×48/96 Hz) which is the same as that of the system clock SCLK to be described below.

Figure 5:
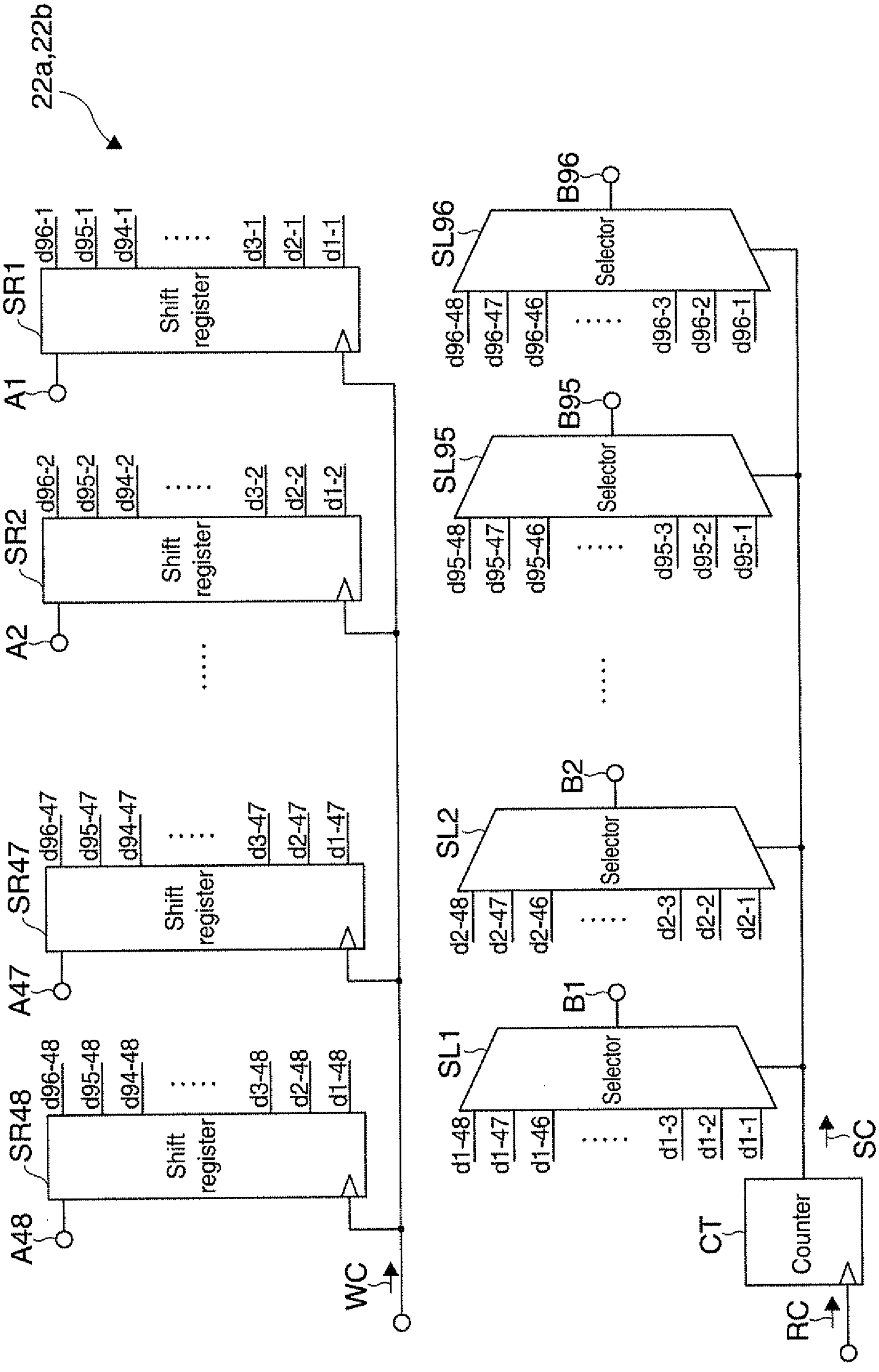
FIG. 5 is a block diagram showing a composition example of the matrix conversion circuits 22*a* and 22*b*.

Next, a detailed circuit composition of the matrix conversion circuits 22*a* and 22*b* is described. FIG. 5 is a block diagram showing a composition example of the matrix conversion circuits 22*a* and 22*b*, As shown in FIG. 5, each of the matrix conversion circuits 22*a* and 22*b* is equipped with shift registers SR1-SR48 in the number of subframes (48), selectors SL1-SL96 in the number of phase expansion (96), and a counter CT, and converts the 48-bit digital codes inputted in 48 input terminals A1-A48 into the 96-bit data described above, and outputs them through 96 output terminals B1-B96.

Each of the shift registers SR1-SR48 is equipped with one input terminal and 96 output terminals, and sequentially shifts 1-bit data inputted in the input terminal in synchronism with the write clock WC, and sequentially outputs the 1-bit data from one of the 96 output terminals. As the write clock WC, the dot clock signal DCLK (with a frequency of about 124 MHz) outputted from the write timing controller 24 is used. The first bit-the 48$^{th}$ bit in each digital code outputted from the digital code conversion section 21 are inputted in the input terminals A1-A48 of the shift registers SR1-SR48, respectively.

Each of the selectors SL1-SL96 is equipped with 48 input terminals and one output terminal, and selects one of 1-bit data inputted in each of the 48 input terminals based on the count signal SC outputted from the counter CT, and outputs the selected 1-bit data through the output terminal. The output terminals of the shift registers SR1-SR48 and the input terminals of the selectors SL1-SL96 having mutually the same codes are mutually connected. For example, the output terminal of the shift register SR1 appended with a code d1-1 is connected to the input terminal of the selector SL1 appended with the same code d1-1.

To avoid complexity in FIG. 5, illustration of connecting relations between the output terminals of the shift registers SR1-SR48 and the input terminals of the selectors SL1-SL96 are omitted. The output terminal B1 of the selector SL1 sequentially outputs bits indicating the luminance level of the subframe for the first pixel among the pixels in the number of phase expansion. Similarly, each of the output terminals of the selectors SL2-SL96 sequentially outputs bits indicating the luminance level of the subframe for each of the second-96$^{th}$ pixel among the pixels in the number of phase expansion, respectively.

The counter CT counts the read clock RC inputted externally, and outputs the counted value as a count signal SC. The counter CT is a 6-bit counter that is capable of counting the number of subframes (48), and repeats counting of "1" through "48." It is noted that the read clock RC can be generated by frequency-dividing the dot clock signal DCLK (with a frequency of about 124 MHz) outputted from the write timing controller 24 by half using an unshown frequency-divider provided at the matrix conversion section 22. Therefore, the frequency of the read clock RC is about 62.2 MHz that is half the frequency of the write clock WC.

The frame buffer section 23 is equipped with two frame buffers 23*a* and 23*b*, which temporarily store 96-bit data that has been converted by the matrix conversion section 22, in other words, display data of an image to be displayed on the liquid crystal panel 10. The frame buffer 23*b* is used to temporarily store display data for, for example, an odd numbered frame, and the frame buffer 23*b* may be used to temporarily store display data for, for example, an even numbered frame. Writing of the display data to these frame buffers 23*a* and 23*b* is switched each time the vertical synchronization signal VSYNC is inputted from the write timing controller 24.

Figure 6:
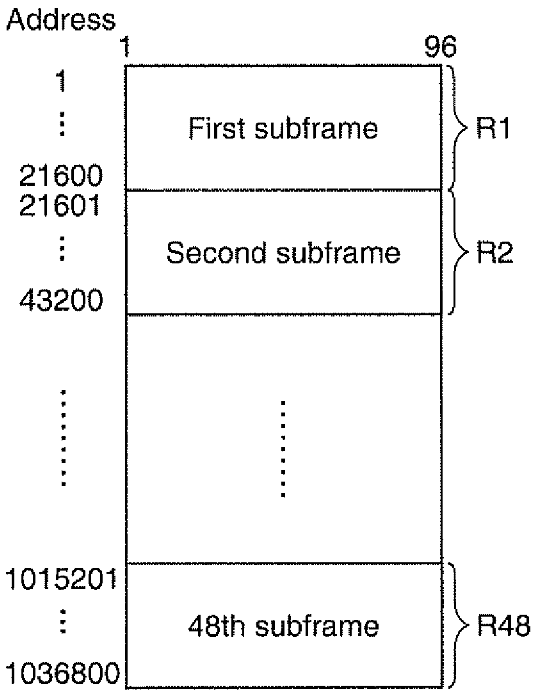
FIG. 6 is a figure showing an example of memory map of frame buffers 23*a* and 23*b*.

FIG. 6 is a figure showing an example of the memory map of the frame buffers 23*a* and 23*b*. Each of the frame buffers 23*a* and 23*b* has a storage capacity for storing display data for one frame, and is divided into 48 regions R1-R48 that store luminance data of the first-$48^{th}$ subframes, respectively, as shown in FIG. 6. Each of the regions R1-R48 is set to have a capacity capable of storing display data for at least one subframe.

In the present embodiment, the liquid crystal device 1 is assumed to have 1,920 pixels connected to each of the scanning lines 11, 1,080 scanning lines 11 in total, and the number of phase expansion being "96." Twenty 96-bit display data sets are necessary to write to 1,920 pixels connected to one scanning line 11. Accordingly, each of the regions R1-R48 is set to have a capacity capable of storing at least 21,600 (=20×1,080) 96-bit display data sets. In the example shown in FIG. 6, in each of the frame buffers 23*a* and 23*b*, a storage region specified by addresses "1"-"21600" is set at the region R1, and a storage region specified by addresses "21601"-"43200" is set at the region R2. Also, a storage region specified by addresses "1015201"-"1036800" is set at the region R48.

The write timing controller 24 controls, based on the dot clock signal DCLK, the horizontal synchronization signal HSYNC, and the vertical synchronization signal VSYNC outputted from an unshown control circuit, the operation timing of the matrix conversion section 22, and write timing of writing display data to the frame buffers 23*a* and 23*b*. It is noted that the write timing controller 24 outputs the dot clock signal DCLK and the vertical synchronization signal VSYNC to the matrix conversion section 22, and outputs the vertical synchronization signal VSYNC to the frame buffer section 23. The write address controller 25 generates and outputs write addresses for writing display data to the frame buffers 23*a* and 23*b*, based on a control signal outputted from the write timing controller 24.

The oscillator 26 generates a system clock signal SCLK having a predetermined frequency and outputs the system clock signal SCLK to the read timing controller 27. Here, when the frame frequency $f_{FM}$ is 60 Hz, the number of subframes within one frame is "48," the number of scanning lines is 1,080, the number of the data lines 13 is 1,920, and the number of phase expansion is "96," the frequency $f_{SCLK}$ of the system clock signal SCLK is about 62.2 MHz (1,920×1,080×60×48/96 Hz).

The read timing controller 27 controls the readout timing to read display data from the frame buffers 23*a* and 23*b*, based on the system clock signal SCLK outputted from the oscillator 26 and the vertical synchronization signal VSYNC outputted from the unshown control circuit. More specifically, the read timing controller 27 generates a polarity inversion signal FR, a scanning start pulse YSP, a scanning transfer clock YCLK, and a data transfer start pulse XSP, and controls the readout timing.

The polarity inversion signal FR is a signal that defines the polarity inversion period of write voltage to the pixels 14 (in other words, a signal that defines the common inversion operation period). In accordance with the present embodiment, the polarity inversion period is decided so that the polarity is inverted once at each one frame. In other words, the polarity inversion signal FR is a pulse signal whose level changes once at each one frame. In the present embodiment, when the polarity inversion signal FR is at high level, a voltage with a positive polarity is written to the pixels 14, and when the polarity inversion signal FR is at low level, a voltage with a negative polarity is written to the pixels 14.

The scanning start pulse YSP is a signal that defines the start timing of each of the subframes, and is generated by frequency-dividing the system clock signal SCLK. When the frame frequency f FM is 60 Hz, and the number of subframes in one frame is "48," the frequency $f_{YSP}$ of the scanning start pulse YSP is 2.88 kHz (60×48 Hz).

The scanning transfer clock YSLK is a signal that defines the scanning speed on the scanning side (Y side) (in other words, a signal that defines the output timing of the scanning signal G1, G2, . . . , Gin), and is generated by frequency-dividing the system clock signal SCLK. When the frequency $f_{YSP}$ of the scanning start pulse YSP is 2.88 kHz, and the number of the scanning lines 11 is 1,080, the frequency $f_{YCLK}$ of the scanning transfer clock YCLK is 1.5552 MHz (2.88 kHz×1,080/2).

The data transfer start pulse XSP is a signal that defines the start timing of one horizontal scanning period, and is generated by frequency-dividing the system clock signal SCLK. When the frequency $f_{YSP}$ of the scanning start pulse YSP is 2.88 kHz, and the number of the scanning lines 11 is 1,080, the frequency $f_{XSP}$ of the data transfer start pulse XSP is 3.1104 MHz (2.88 kHz×1,080).

The read timing controller 27 outputs the vertical synchronization signal VSYNC to the read address controller 28, the system clock signal SCLK to the read address controller 28 and the data line drive circuit 40, and the polarity inversion signal FR to the drive voltage generation circuit 60 and the level shifter 30. Also, the read timing controller 27 outputs the scanning start pulse YSP and the scanning transfer clock YCLK to the scanning line drive circuit 50, and outputs the data transfer start pulse XSP to the data line drive circuit 40.

The read address controller 28 generates read addresses for reading out display data from the frame buffers 23*a* and 23*b*, based on the system clock signal SCLK and the vertical synchronization signal VSYNC outputted from the read timing controller 27.

Based on the values of display data (digital codes of each subframe for 96 pixels) read out from the frame buffer section 23, and the level of the polarity inversion signal FR, the level shifter 30 shifts the voltage level of each code defining display data to a voltage level to be supplied to the pixels 14. Then, the level shifter 30 outputs the codes for 96 pixels whose voltage levels has been shifted to the data line drive circuit 40 as display data XDATA (96 bits).

More specifically, when each code Ci (i is an integer that satisfies 1≤i≤96) defining display data is "1" that designates a first level, and the polarity inversion signal FR is at high level (positive polarity), the level shifter 30 shifts the voltage level of the code Ci to the maximum voltage VD1. When the code Ci is "1" that designates the first level, and the polarity inversion signal FR is at low level (negative polarity), the level shifter 30 shifts the voltage level of the code Ci to the minimum voltage VD2.

On the other hand, when the code Ci is "0" that designates a second level, and the polarity inversion signal FR is at high level (positive polarity), the level shifter 30 shifts the voltage level of the code Ci to the minimum voltage VD2. Also, when the code Ci is "0" that designates the second level, and the polarity inversion signal FR is at low level (negative polarity), the level shifter 30 shifts the voltage level of the code Ci to the maximum voltage VD1.

By the voltage level shifting operation by the level shifter 30 and the common voltage inversion operation by the drive voltage generation circuit 60 described above, voltages with a positive polarity with respect to the common voltage VCOM are written to the pixels 14 during the period in which the polarity inversion signal FR is at high level. Also, voltages with a negative polarity with respect to the common voltage VCOM are written to the pixels 14 during the period in which the polarity inversion signal FR is at low level.

The data line drive circuit 40 grasps the start timing of one horizontal scanning period by the data transfer start pulse XSP, and simultaneously outputs display data XDATA (96 bits) to 96 data lines 13 as data signals for 96 pixels in synchronism with the system clock SCLK. The data line drive circuit 40 repeats the operation to output data signals for 96 pixels 20 times, while shifting the data lines 13 in the unit of 96 pixels in synchronism with the system clock SCLK, thereby completing the operations to output data signals for 1,920 pixels in one horizontal scanning period. The scanning line drive circuit 50 grasps the start timing of each subframe by the scanning start pulse YSP, and sequentially outputs scanning signals G1, G2, G3, . . . , Gm each having a voltage VG to each of the scanning lines 11 in synchronism with the scanning transfer clock YCLK.

The drive voltage generation circuit 60 generates the voltage VG (a gate-on voltage of the transistor 15) of the scanning signal G1, G2, . . . , Gm, and outputs the voltage VG to the scanning line drive circuit 50. Also, the drive voltage generation circuit 60 generates a reference voltage V0, the maximum voltage VD1 (a black voltage in the case of positive polarity), and the minimum voltage VD2 (a black voltage in the case of negative polarity) of the data signals d1, d2, . . . , dn, and outputs them to the level shifter 30. The drive voltage generation circuit 60 also generates the common voltage VCOM, and outputs the common voltage VCOM to the counter electrode 17 and the holding capacity line 12 provided at the liquid crystal panel 10. The maximum voltage VD1 and the minimum voltage VD2 are set to values symmetrical about the reference voltage V0 as the center.

Also, the drive voltage generation circuit 60 has a function to invert the polarity of the common voltage VCOM through the reference voltage V0 as the center, according to the level of the polarity inversion signal FR outputted from the read timing controller 27. In other words, when the polarity inversion signal FR is at high level (positive polarity), the common voltage VCOM has a value on the negative side (the minimum value) with respect to the reference voltage V0; and when the polarity inversion signal FR is at low level (negative polarity), the common voltage VCOM has a value on the positive side (the maximum value) with respect to the reference voltage V0. It is noted that the maximum value of the common voltage VCOM is set to be equal to the maximum voltage VD1 of the data signal, and the minimum value of the common voltage VCOM is set to be equal to the minimum voltage VD2 of the data signal.

Figure 7A:
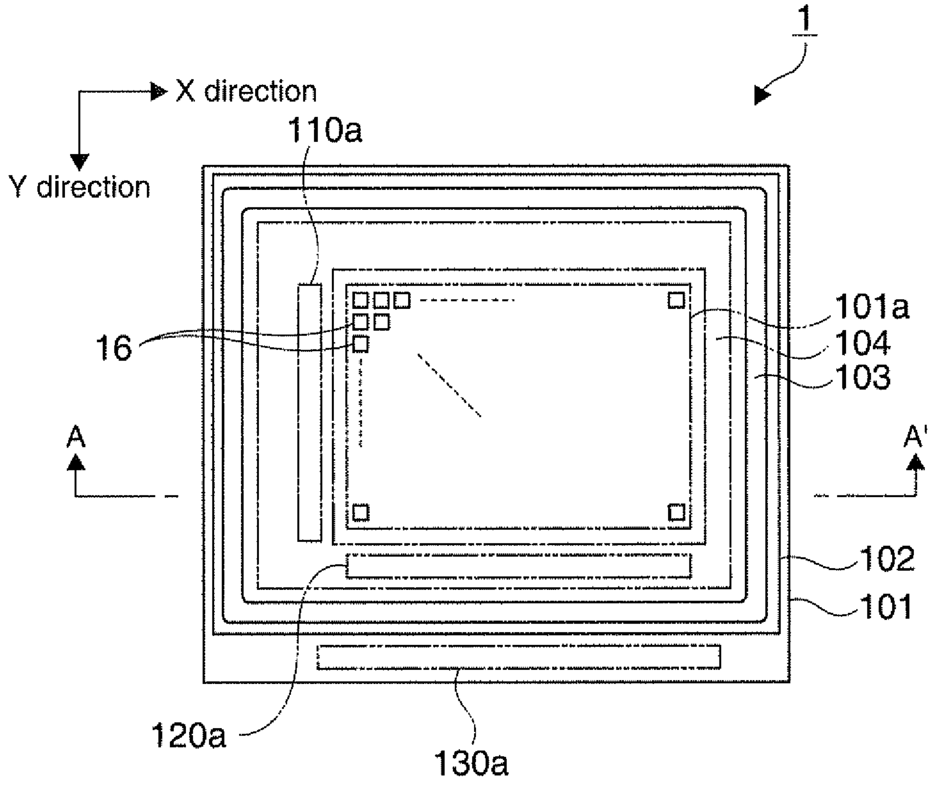
FIG. 7 is a view showing an overall composition of a liquid crystal device 1.
Figure 7B:
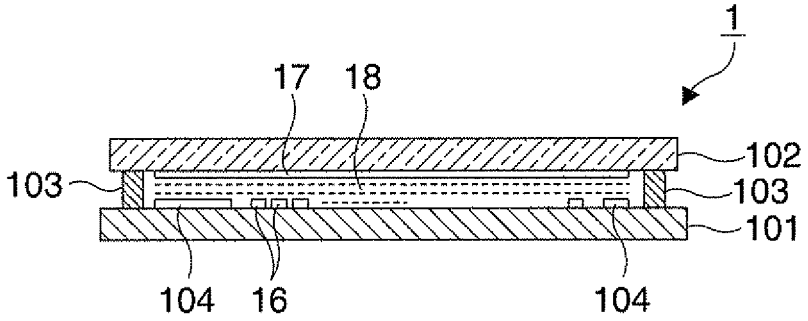

Next, the overall composition of the liquid crystal device 1 is described. FIG. 7 is a schematic diagram of the overall composition of the liquid crystal device 1, wherein FIG. 7A is a plan view, and FIG. 7B is a cross-sectional view taken along arrowed lines A-A' in FIG. 7A. As shown in FIG. 7, the liquid crystal device 1 includes an element substrate 101 with pixel electrodes 16 and the like formed thereon, a counter substrate 102 with a counter electrode 17 and the like formed thereon, which are bonded to each other with a constant gap therebetween provided by means of a sealing member 103, and liquid crystal 18 sealed in the gap as an electro-optical material. In effect, the sealing member 103 has a cut section, and after the liquid crystal 18 is filled in the gap through the cut section, the seal member 103 is sealed with a sealing material. Illustration of these details is however omitted in the figures.

The element substrate 101 and the counter substrate 102 are transparent substrates, made of glass or the like. In the case of a reflection type liquid crystal device, the element substrate 101 may be made of a semiconductor substrate. In this case, as the semiconductor substrate is non-transparent, the pixel electrodes 16 may be made of reflective metal such as aluminum or the like. Also, a light-shielding film 104 is provided on the element substrate 101 in a region inside the sealing member 103 and outside the display region 101*a*. Among the region where the light-shielding film 104 is formed, the scanning line drive circuit 50 is formed in a region 110*a*, and the level shifter 30 and the data line drive circuit 40 are formed in a region 120*a*.

In other words, the light-shielding film 104 prevents light from entering the drive circuits formed in these regions 110*a* and 120*a*. The light-shielding film 104, together with the counter electrode 17, is structured such that the common voltage VCOM is applied. Also, a plurality of connection terminals are formed on the element substrate 101, outside the region 120*a* where the data line drive circuit 40 is formed, in a region 130*a* separated by the sealing member 103, and are structured to receive control signals, power supply and the like from outside.

On the other hand, the counter electrode 17 on the counter substrate 102 is electrically connected to the light-shielding film 104 and the connection terminals on the element substrate 101 by an electrically conductive member (not shown) provided in at least one of the four corners in the substrate bonded section. In other words, the common voltage VCOM is applied to the light-shielding film 104 through the connection terminal provided on the element substrate, and is further applied to the counter electrode 17 through the electrically conductive member.

The counter substrate 102 is provided with, depending on application of the liquid crystal device 1, for example, in a direct viewing type, firstly, a color filter arranged in a stripe, mosaic, or triangle form or the like, and secondly, a light shielding film (black matrix) made of, for example, metal material or resin. In application to colored light modulation, for example, when the counter substrate 102 is used as a light valve of a projector to be described below, the color filter is not formed. In the direct viewing type, a light source for irradiating the liquid crystal device 1 with light from the side of the counter substrate 102, or from the side of the element substrate 101 is provided if required.

In addition, an alignment film (not shown in the drawing) which is rubbed in a predetermined direction, is provided on the electrode formation surface of each of the element substrate 101 and the counter substrate 102 to define the orientation direction of liquid crystal molecules in a non-voltage application state. Also, a polarization plate (not shown in the drawing) is provided on the counter substrate 102 according to the orientation direction. However, when a polymer dispersion type liquid crystal comprising fine particles dispersed in a polymer is used as the liquid crystal 18, the alignment film and the polarization plate are unnecessary, such that the efficiency of light utilization is improved, which is advantageous from the viewpoint of increasing luminance and reducing power consumption.

Figure 8:
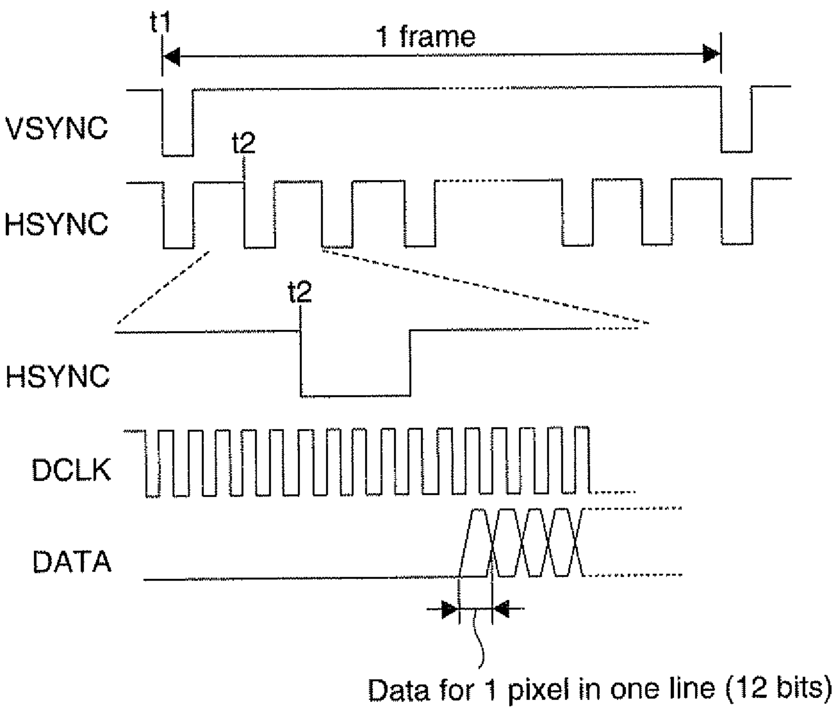
FIG. 8 is a timing chart for describing input timing of image data DATA.

Next, the operation of the liquid crystal device 1 having the composition described above is described. FIG. 8 is a timing chart for describing the input timing of image data DATA. As shown in FIG. 8, the timing to start one frame is at time t1 when a falling edge of the vertical synchronization signal VSYNC occurs, and the timing to start scanning of the first scanning line 11 (the first line) within this one frame is at time t2 when a first falling edge of the horizontal synchronization signal HSYNC occurs.

The number of periods of the horizontal synchronization signal HSYNC within one frame is 1,080 periods, which is the number of the scanning lines 11. The number of periods of the dot clock signal DCLK within one period of the horizontal synchronization signal HSYNC is 1,920 periods, which is the number of pixels connected to one scanning line 11. As the unshown control circuit sequentially outputs 12-bit image data DATA for each of the pixels, the image data DATA are sequentially inputted in the digital code conversion section 21 in synchronism with the dot clock signal DCLK, as shown in FIG. 8.

The image data DATA inputted in the digital code conversion section 21 is sequentially converted into digital codes each composed of a plurality of bits indicating a luminance level of each subframe. More specifically, digital codes stored in addresses corresponding to the gradations of the inputted image data DATA are sequentially read out from the nonvolatile memory (see FIG. 3) provided at the digital code conversion section 21, and the image data DATA are converted into digital codes. For example, when image data DATA with a gradation "5" is inputted, it is converted into a 48-bit digital code 0×000000000100 stored in the storage region specified by the address 0×005 in the nonvolatile memory. The image data DATA is inputted in synchronism with the dot clock signal DCLK (with a frequency of about 124 MHz), such that the conversion processing by the digital code conversion section 21 is performed at the same operation frequency as that of the dot clock signal DCLK.

Figure 9:
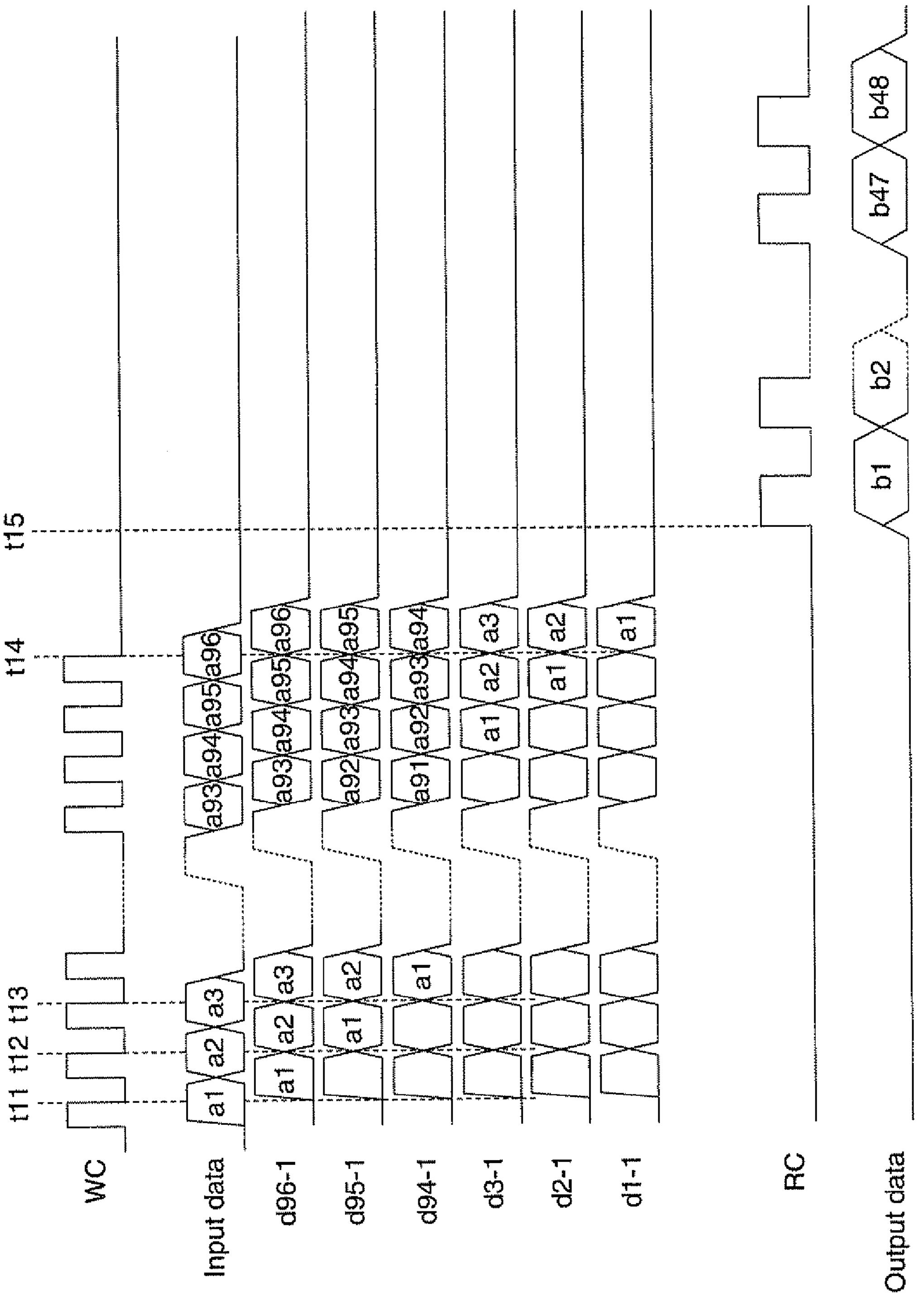
FIG. 9 is a timing chart for describing operations of the matrix conversion circuit 22*a*.

The digital code converted by the digital code conversion section 21 is inputted in the matrix conversion section 22. Here, in an initial state, it is assumed that the matrix conversion circuit 22*a* is selected as a circuit to convert the inputted digital code. FIG. 9 is a timing chart for describing the operation of the matrix conversion circuit 22*a*. When the matrix conversion circuit 22*a* is in the selected state, the write clock WC is inputted in the matrix conversion circuit 22*a*, and the entire shift registers SR1-SR48 are placed in an operation state, as shown in FIG. 9.

As the 48-bit digital code is inputted in the matrix conversion circuit 22*a* in such a state, the data consisting of the first bit-the 48$^{th}$ bit are inputted in the input terminals of the shift registers SR1-SR48 through the input terminals A1-A48, respectively, and outputted from one of the 96 output terminals. Here, the operation of the shift registers SR1-SR48 is described in detail, using the shift register SR1 as an example.

As shown in FIG. 9, data at the first bit "a1," "a2," . . . , "a96" among the 48-bit digital codes sequentially inputted in the matrix conversion circuit 22*a* are sequentially inputted in the shift register SR1 in synchronism with the write clock WC (see "Input Data" in FIG. 9). First, when the first data "a1" is inputted in the shift register SR1, this data is outputted from an output terminal appended with code d96-1 at the timing of a falling edge of the write clock WC (at time t11).

When the next data "a2" is inputted, the data "a1" previously inputted is shifted in synchronism with the write clock WC and outputted from an output terminal appended with code d95-1 at the timing of a falling edge of the write clock WC. At the same time, the new data "a2" is outputted from an output terminal appended with code d96-1 at the timing of a falling edge of the write clock WC (at time t12).

Then, when the data "a3" is inputted, the data "a1" and "a2" previously inputted are shifted in synchronism with the write clock WC and outputted from the output terminals appended with codes d94-1 and d95-1 at the timing of a falling edge of the write clock WC, respectively. At the same time, the new data "a3" is outputted from the output terminal appended with code d96-1 at the timing of a falling edge of the write clock WC (at time t13). In a similar manner, each time new data is inputted, the operation in which the previously inputted data are sequentially shifted and outputted, and the new data is outputted from the output terminal appended with code d96-1, is repeated.

As the operation described above is repeated, and when the data "a96" is inputted, the data "a1"-"a96" are outputted from the output terminals of the shift registers SR1 appended with codes d1-1-d96-1, respectively (at time t14). The data outputted from the respective output terminals appended with code d1-1-d96-1 are inputted in the input terminals of the selectors SL1-SL96 appended with the same codes, respectively. It is noted that the shift register SR1 is used here as an example, but similar operation as described above is performed at the other shift registers SR2-SR48.

When the operation described above is completed, the matrix conversion circuit 22*b* is selected as a circuit to convert the inputted digital codes, and the matrix conversion circuit 22*a* is put in a non-selected state. Then, the write clock WC is inputted in the matrix conversion circuit 22*b*, and operations similar to the operations of the matrix conversion circuit 22*a* are performed by the matrix conversion circuit 22*b*. In parallel with this, the read clock RC is inputted in the matrix conversion circuit 22*a* that is in a non-selected state, whereby the counter CT starts counting. Then, at each of the selectors SL1-SL96, one of the 48 input terminals is selected based on the count signal SC outputted from the counter CT, and data inputted in the selected input terminals are outputted from the output terminals B1-B96 as 96-bit data "b1" (at time t15).

Each time the read clock RC is inputted, a different one of the input terminals is sequentially selected at each of the selectors SL1-SL96, whereby, as shown in FIG. 9, converted 96-bit data "b2," . . . , "b48" are sequentially outputted from the output terminals B1-B96 ("Output Data" in FIG. 9). When the operation described above has been performed for the number of frames (48 times), the matrix conversion circuit 22*a* is again put in a selected state whereby the operation of writing digital codes to the matrix conversion circuit 22*a* is performed, and the matrix conversion circuit 22*b* is put in a non-selected state whereby the operation of outputting 96-bit data from the matrix conversion circuit 22*b* is performed. Thereafter, the selected state and the non-selected state of the matrix conversion circuits 22*a* and 22*b* are alternately switched, and operations similar to those describe above are repeated.

The 96-bit data (display data) outputted from the matrix conversion section 22 (the matrix conversion circuit 22*a*, 22*b*) are inputted in the frame buffer section 23. It is noted that, in an initial state, it is assumed that the frame buffer 23*a* is selected. Display data inputted in the frame buffer section 23 are sequentially inputted in the frame buffer 23*a*, and written at addresses specified by write addresses outputted from the write address controller 25.

As described above, the display data outputted from the matrix conversion section 22 is data composed of bits indicating a luminance level of the same subframe in the unit of pixels in the number of phase expansion. For this reason, the display data outputted first from the matrix conversion section 22 (the data "b1" in FIG. 9) is stored in a storage region specified by the head address (address "1") of the region R1 of the frame buffer 23*a* by the control of the write address controller 25. The display data outputted next from the matrix conversion section 22 (the data "b2" in FIG. 9) is stored in a storage region specified by the head address (address "21601") of the region R2 of the frame buffer 23*a* by the control of the write address controller 25. In this manner, display data outputted from the matrix conversion section 22 are sequentially stored in the regions R1-R48 shown in FIG. 6.

When the display data for one frame are outputted from the matrix conversion section 22, display data for each of the first-48$^{th}$ subframes are stored in each of the regions R1-R48 of the frame buffer 23*a*, respectively. It is noted that the capacity of display data for one frame is 1,920×1,080×60×46 bits. When the display data for one frame is stored in the frame buffer 23*a*, the frame buffer 23*b* is selected and writing of display data outputted from the matrix conversion section 22 is started, and read addresses are outputted from the read address controller 28 and reading of display data stored in the frame buffer 23*a* is started.

Figure 10:
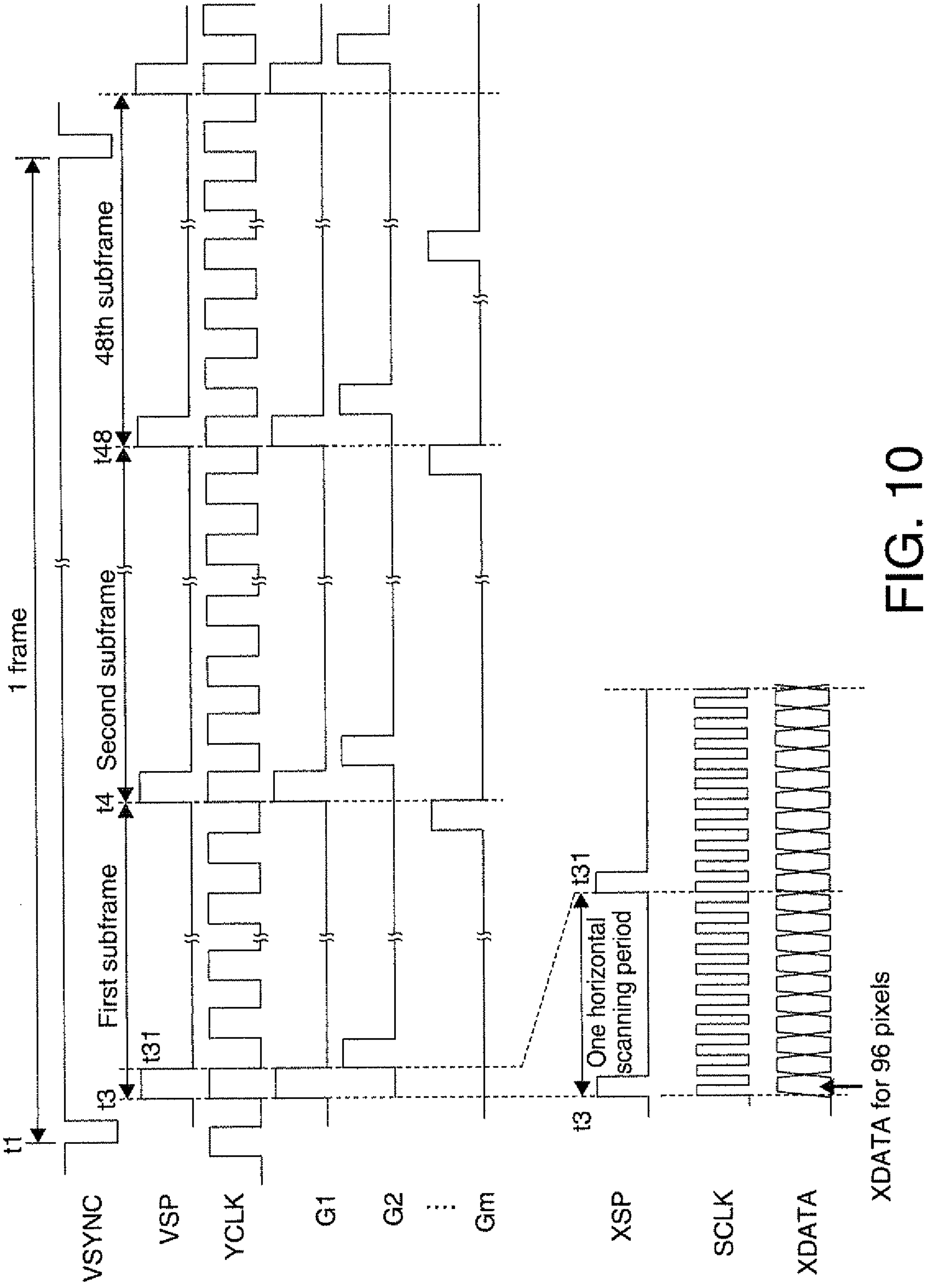
FIG. 10 is a timing chart for describing operations at the time of image display corresponding to display data.

FIG. 10 is a timing chart for describing the operation at the time of displaying an image according to display data. As shown in FIG. 10, when a falling edge of the vertical synchronization signal VSYNC occurs at time t1 and one frame is started, scanning start pulses YSP are sequentially generated by the read timing controller 27, whereby the first-48$^{th}$ subframes are sequentially displayed (at time t1, t4, . . . , t48).

Here, in FIG. 10, let us focus on time t3 (the start timing of the first subframe). The read address controller 28 generates a read address indicating the head address (address "1") of the region R1 of the frame buffer 23*a* in synchronism with a rising edge of the system clock signal SCLK and outputs the read address to the frame buffer section 23. Then, 96-bit display data stored in the storage region specified by the address "1" of the frame buffer 23*a* is read out and outputted to the level shifter 30.

Based on the value of code Ci ($1 \leq i \leq 96$) defining the 96-bit display data inputted and the level of the polarity inversion signal FR, the level shifter 30 shifts the voltage level of each code Ci to a voltage level to be supplied to the pixels 14, and outputs the code Ci after the voltage level has been shifted to the data line drive circuit 40 as display data XDATA (96 bits). For example, when the code Ci is "1" that designates the first level (black), and the polarity inversion signal FR is at high level (positive polarity), the voltage level of the code Ci is shifted to the maximum voltage VD1 (in this instance, the common voltage VCOM generated by the drive voltage generation circuit 60 has a value on the negative polarity side (the minimum value) with respect to the reference voltage V0).

On the other hand, the scanning line drive circuit 50 grasps the start timing of the first subframe by a rising edge of the scanning start pulse YSP at time t3, and outputs a scanning signal G1 having a voltage VG to the first scanning line 11 in the Y direction in synchronism with a rising edge of the scanning transfer clock YOLK. As a result, the transistors 15 in the 1,920 pixels 14 connected to the first scanning line 11 in the Y direction are placed in an on-state.

Then, the data line drive circuit 40 grasps the start timing of the first horizontal scanning period by a rising edge of the data transfer start pulse XSP at time t3, and outputs display data XDATA (96 bits) as data signals d1, d2, . . . , d96 for 96 pixels to 96 of the data lines 13, in other words, to the first to 96$^{th}$ data lines 13 in the X direction. By this, black/white voltages corresponding to the first subframe are written to the first through 96$^{th}$ pixels connected to the first scanning line 11 in the Y direction.

Then, as the next rising edge occurs in the system clock SCLK, the read address controller 28 generates a read address indicating the next address (address "2") in the region R1 of the frame buffer 23*a*, and outputs the read address to the frame buffer section 23. Then, 96-bit display data stored in the storage region specified by the address "2" of the frame buffer 23*a* is read out and outputted to the level shifter 30. Then, the level shifter 30 outputs code Ci for 96 pixels whose voltage level has been shifted to the data line drive circuit 40 as the next display data XDATA (96 bits).

Then, in synchronism with a rising edge of the system clock SCLK, the data line drive circuit 40 outputs display data XDATA (96 bits) as data signals d97, d98, . . . , d192 for the next 96 pixels to 96 of the data lines 13, in other words, to the 97$^{th}$ to 192$^{nd}$ data lines 13 in the X direction. By this, black/white voltages corresponding to the first subframe are written to the 97$^{th}$ through 192$^{nd}$ pixels connected to the first scanning line 11 in the Y direction. Each time a rising edge of the system clock SCLK occurs, an operation similar to the above-described operation is repeated 20 times, whereby black/white voltages corresponding to the first subframe are written to the entire 1,920 pixels 14 connected to the first scanning line 11 in the Y direction.

Then, the scanning line driving circuit 50 outputs a scanning signal G2 having a voltage VG to the second scanning line 11 in the Y direction, in synchronism with a falling edge of the scanning transfer clock YCLK at time t31. By this, the transistors 15 in the 1,920 pixels 14 connected to the second scanning line 11 in the Y direction are placed in an on-state. The read address controller 28 generates a read address indicating the 21$^{st}$ address (address "21") in the region R2 of the frame buffer 23*a*, and outputs the read address to the frame buffer section 23. Then, 96-bit display data stored in the storage region specified by the address "21" is read out and outputted to the level shifter 30. Then, the level shifter 30 outputs code Ci for 96 pixels whose voltage level has been shifted to the data line drive circuit 40 as the next display data XDATA (96 bits).

Then, the data line drive circuit 40 grasps the start timing of the second horizontal scanning period by a rising edge of the data transfer start pulse XSP at time t31, and outputs display data XDATA (96 bits) as data signals d1, d2, . . . , d96 for 96 pixels to the first to 96$^{th}$ data lines 13 in the X direction. By this, black/white voltages corresponding to the first subframe are written to the first through 96$^{th}$ pixels connected to the second scanning line 11 in the Y direction.

Then, as the next rising edge occurs in the system clock SCLK, the read address controller 28 generates a read address indicating the next address (address "22") in the region R1 of the frame buffer 23*a*, and outputs the read address to the frame buffer section 23. Then, 96-bit display data stored in the storage region specified by the address "22" of the frame buffer 23*a* is read out and outputted to the level shifter 30. Then, the level shifter 30 outputs code Ci for 96 pixels whose voltage level has been shifted to the data line drive circuit 40 as the next display data XDATA (96 bits).

Then, in synchronism with a rising edge of the system clock SCLK, the data line drive circuit 40 outputs display data XDATA (96 bits) as data signals d97, d98, . . . d192 for the next 96 pixels to 96 of the data lines 13, in other words, to the $97^{th}$ to $192^{nd}$ data lines 13 in the X direction. By this, black/white voltages corresponding to the first subframe are written to the $97^{th}$ through $192^{nd}$ pixels connected to the second scanning line 11 in the Y direction. Each time a rising edge of the system clock SCLK occurs, an operation similar to the above-described operation is repeated 20 times, whereby black/white voltages corresponding to the first subframe are written to the entire 1920 pixels 14 connected to the second scanning line 11 in the Y direction.

Similar operations as described above are repeated for the third scanning line 11 through the $1080^{th}$ scanning line 11, whereby black/white voltages corresponding to the first subframe are written to the entire 1,920 pixels 14 connected to each of the scanning lines 11. By this, black/white voltages are written to the entire 1,920×1,080 pixels 14, whereby an image corresponding to the first subframe is displayed.

Then, as a rising edge of the scanning start pulse YSP occurs at time t4, and the start timing of the second subframe arrives, the scanning line drive circuit 50 outputs a scanning signal G1 having the voltage VG to the first scanning line 11 in the Y direction in synchronism with the rising edge of the scanning transfer clock YCLK. By this, the transistors 15 in the 1,920 pixels 14 connected to the first scanning line 11 in the Y direction are placed in an on-state.

Then, in synchronism with a rising edge of the system clock signal SCLK at time t4, the read address controller 28 generates a read address indicating the head address (address “21601”) in the region R2 of the frame buffer 23*a*, and outputs the read address to the frame buffer section 23. Then, 96-bit display data stored in the storage region specified by the address “20601” of the frame buffer 23*a* is read out and outputted to the level shifter 30. By this, the level shifter 30 outputs code Ci for 96 pixels after voltage level shift to the data line drive circuit 40 as the next display data XDATA (96 bits).

Then, the data line drive circuit 40 grasps the start timing of the first horizontal scanning period by a rising edge of the data transfer start pulse XSP at time t4, and outputs display data XDATA (96 bits) as data signals d1, d2, . . . , d96 for 96 pixels to the first to $96^{th}$ data lines 13 in the X direction, in synchronism with a rising edge of the system clock SCLK. By this, black/white voltages corresponding to the second subframe are written to the first through $96^{th}$ pixels connected to the first scanning line 11 in the Y direction.

Then, as the next rising edge occurs in the system clock SCLK, the read address controller 28 generates a read address indicating the next address (address “21602”) in the region R2 of the frame buffer 23*a*, and outputs the read address to the frame buffer section 23. Then, 96-bit display data stored in the storage region specified by the address “20602” of the frame buffer 23*a* is read out and outputted to the level shifter 30. Then, the level shifter 30 outputs code Ci for 96 pixels whose voltage level has been shifted to the data line drive circuit 40 as the next display data XDATA (96 bits).

Then, in synchronism with a rising edge of the system clock SCLK, the data line drive circuit 40 outputs display data XDATA (96 bits) as data signals d97, d98, . . . , d192 for the next 96 pixels to 96 of the data lines 13, in other words, to the $97^{th}$ to $192^{nd}$ data lines 13 in the X direction. By this, black/white voltages corresponding to the second subframe are written to the $97^{th}$ through $192^{nd}$ pixels connected to the first scanning line 11 in the Y direction. Each time a rising edge of the system clock SCLK occurs, an operation similar to the above-described operation is repeated 20 times, whereby black/white voltages corresponding to the second subframe are written to the entire 1,920 pixels 14 connected to the first scanning line 11 in the Y direction.

Similar operations as described above are repeated for the second scanning line 11 through the $1080^{th}$ scanning line 11, like for the first subframe, whereby black/white voltages corresponding to the second subframe are written to the entire 1,920 pixels 14 connected to each of the scanning lines 11. By this, black/white voltages are written to the entire 1,920×1,080 pixels 14, whereby an image corresponding to the second subframe is displayed. The operation for each of the subframes described above is repeated until the $48^{th}$ subframe that occurs at time t48, thereby completing an image display for one frame starting at time t1.

According to the liquid crystal device 1 in accordance with the present embodiment, gradation data indicating gradations of the respective pixels in one frame are converted to digital codes each composed of a plurality of bits indicating a luminance level of each of the subframes by the digital code conversion section 21, the digital codes are converted by the matrix conversion section 11 to data (display data) composed of bits indicating the luminance level of the same subframe in the unit of pixels in the number of phase expansion, and the converted display data are stored in the frame buffer section 23. By this operation, the operation frequency on the input side of the digital code conversion section 21 and the matrix conversion section 22 provided at the display drive circuit 20 is set to about 124 MHz that is equal to the frequency of the dot clock signal DCLK, and the operation frequency on the output side of the matrix conversion section 22 and the frame buffer section 23 is set to about 62.2 MHz that is equal to the frequency $f_{SCLK}$ of the system clock signal SCLK. Therefore, high-definition display can be realized without causing a substantial increase in the circuit scale or an increase in the operation speed.

Figure 11:
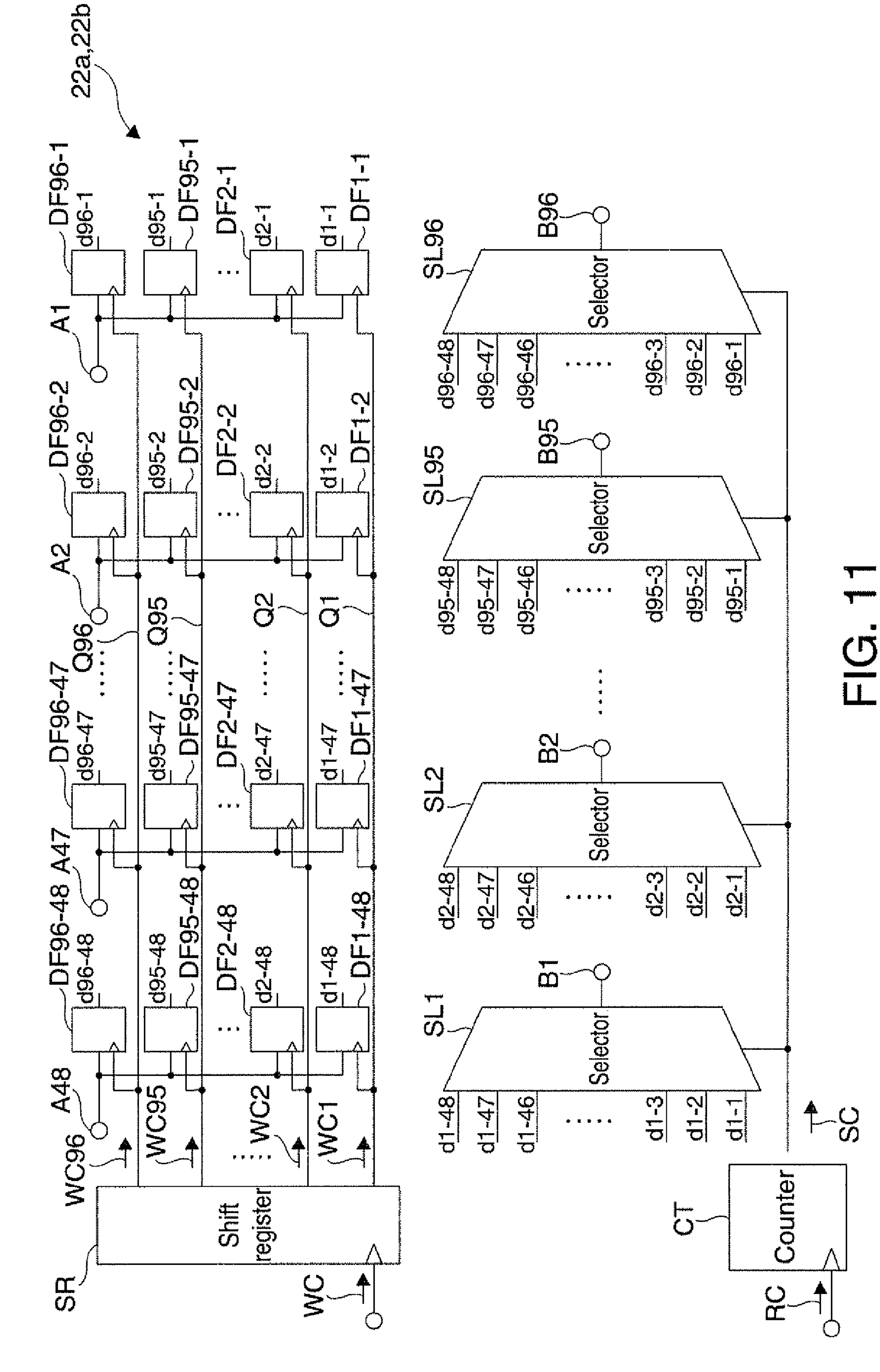
FIG. 11 is a block diagram showing another composition example of matrix conversion circuits 22*a* and 22*b*.

Next, another circuit composition of the matrix conversion circuits 22*a* and 22*b* is described. FIG. 11 is a block diagram of another composition example of the matrix conversion circuits 22*a* and 22*b*. Each of the matrix conversion circuits 22*a* and 22*b* shown in FIG. 11 is equipped with one shift register SR and (the number of subframes×the number of phase expansion) (48×96) flip-flops (D flip-flop circuits) DF1-1-DF1-48, . . . , DF96-1-DF96-48, instead of the shift registers SR1-SR48 in the number of subframes (48) of each of the matrix conversion circuits 22*a* and 22*b* shown in FIG. 5; and each of the matrix conversion circuits 22*a* and 22*b* converts 48-bit digital codes inputted from 48 input terminals A1-A48 into 96-bit data described above, and outputs through 96 output terminals B1-B96. The matrix conversion circuits 22*a* and 22*b* in this embodiment are aimed at reducing the power consumption, compared to those shown in FIG. 5. It is noted that each of the matrix conversion circuits 22*a* and 22*b* shown in FIG. 11 is equipped with selectors SL1-SL96 in the number of phase expansion (96), and a counter CT, like those shown in FIG. 5.

The shift register SR is equipped with one clock input terminal in which the write clock WC is inputted and 96 output terminals, and sequentially outputs the clock pulse from one of the 96 output terminals. It is noted that, as the write clock WC, the dot clock signal DCLK (with a frequency of about 124 MHz) outputted from the write timing controller 24 is used, like the matrix conversion circuits 22*a* and 22*b* shown in FIG. 5. The output terminals of the shift register SR are connected to signal lines Q1-Q96 for transmitting the clock pulse, respectively.

Each of the flip-flops DF1-1-DF1-48, . . . , DF96-1-DF96-48 is equipped with one input terminal, one clock input terminal, and one output terminal, wherein data inputted in the input terminal is outputted from the output terminal in synchronism with the clock pulse inputted in the clock input terminal. The clock input terminals of the flip-flops DF1-1-DF1-48 are connected to the signal line Q1. Similarly, the input terminals of the flip-flops DF2-1-DF2-48, . . . , the input terminals of the flip-flops DF96-1-DF96-48 are connected to the signal line Q2, . . . , the signal line Q96, respectively.

Also, the input terminals of the flip-flops DF1-1-DF96-1 are connected to the input terminal A1, in which the first bits of digital codes outputted from the digital code conversion section 21 are inputted. Similarly, the input terminals of the flip-flops DF1-2-DF96-2, . . . , the input terminals of the flip-flops DF1-48-DF96-48 are connected to the input terminal A2, . . . , the input terminal A48, respectively, in which the second bits, . . . , the 48$^{th}$ bits of digital codes outputted from the digital code conversion section 21 are inputted, respectively.

Each of the selectors SL1-SL96 is equipped with 48 input terminals and one output terminal, and selects one of 1-bit data inputted in each of the 48 input terminals based on the count signal SC outputted from the counter CT, and outputs the data from the output terminal. The output terminals of the flip-flops DF1-1-DF1-48, . . . , DF96-1-DF96-48 and the input terminals of the selectors SL1-SL96 having mutually the same codes are mutually connected. For example, the output terminal of the flip-flop DF1-1 appended with a code d1-1 is connected to the input terminal of the selector SL1 appended with the same code d1-1. It is noted that, in FIG. 10, illustration of connection relations between the output terminals of the flip-flops DF1-1-DF1-48, . . . , DF96-1-DF96-48 and the input terminals of the selectors SL1-SL96 is omitted, like FIG. 5, for the sake of avoiding the complexity.

The counter CT counts the read clock RC inputted externally, and outputs the counted value as a count signal SC. The counter CT is a 6-bit counter that is capable of counting the number of subframes (48), and repeats counting between "1" and "48." It is noted that the read clock RC can be generated by frequency-dividing the dot clock signal DCLK (with a frequency of about 124 MHz) outputted from the write timing controller 24 by half, like the matrix conversion circuits 22*a* and 22*b* shown in FIG. 5, in other words, the read clock RC with a frequency of about 62.2 MHz is used.

Figure 12:
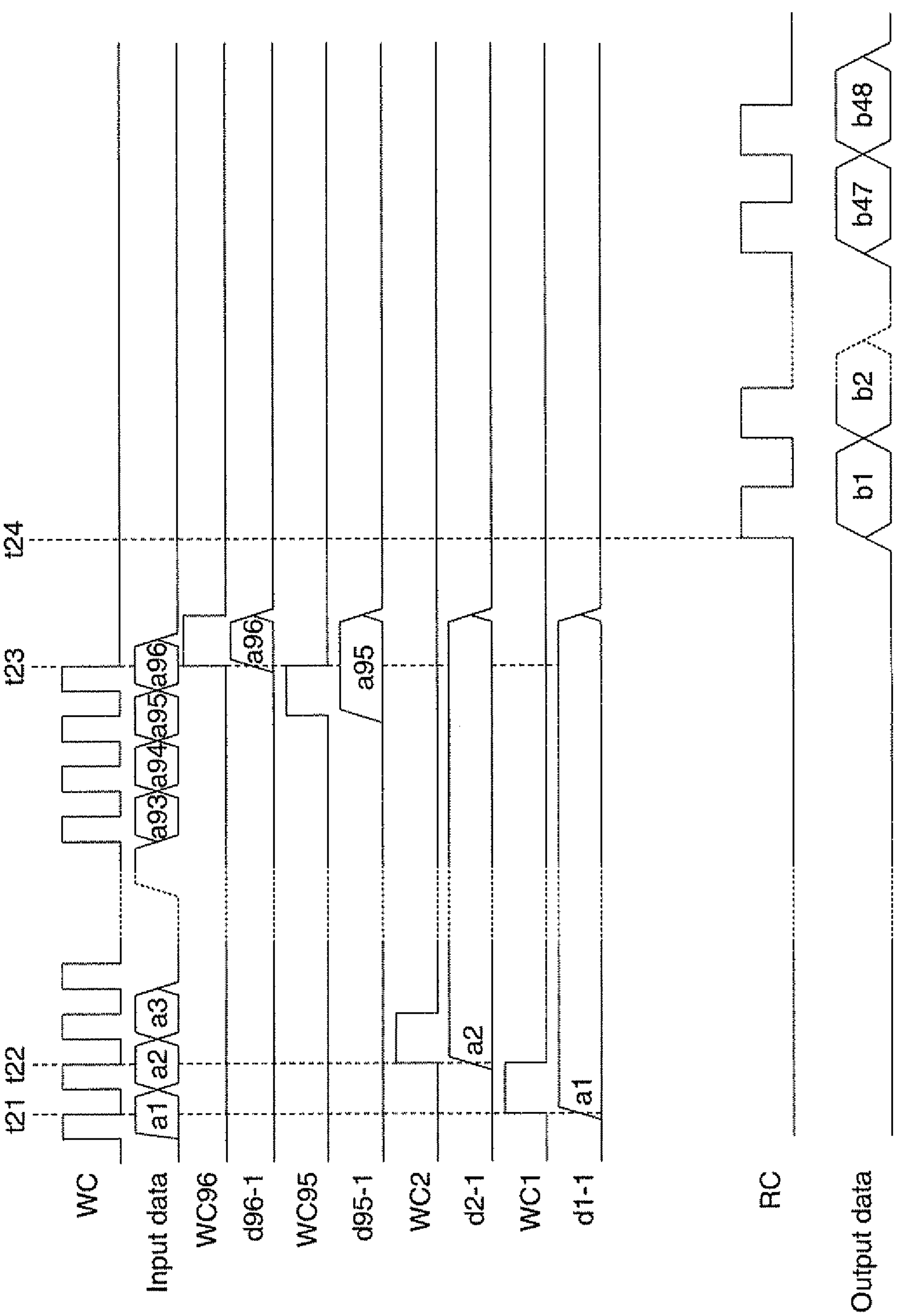
FIG. 12 is a timing chart for describing operations of the matrix conversion circuits 22*a* and 22*b* shown in FIG. 11.

FIG. 12 is a figure for explaining the operation performed by the matrix conversion circuits 22*a* and 22*b* shown in FIG. 11. Here, the operation executed by the matrix conversion circuit 22*a* is described as an example. When the matrix conversion circuit 22*a* is in a selected state, the write clock WC is inputted in the matrix conversion circuit 22*a*, and each time the write clock WC is inputted, the clock pulse is sequentially outputted from one of the 96 output terminals of the shift register SR.

When a clock pulse WC1 is outputted from the output terminal of the shifter register SR connected to the connection line Q1, the 48 flip-flops DF1-1-DF1-48 with the clock input terminals connected to the connection line Q1 are put in an operation state. Then, 48 bits of the digital code inputted through the input terminals A1-A48 are inputted in the input terminals of the flip-flops DF1-1-DF1-48, respectively, and outputted from the output terminals, respectively.

Then, a clock pulse WC2 is outputted from the output terminal of the shifter register SR connected to the connection line Q2, the 48 flip-flops DF2-1-DF2-48 with the clock input terminals connected to the connection line Q2 are put in an operational state. Then, new 48 bits of the digital code inputted through the input terminals A1-A48 are inputted in the input terminals of the flip-flops DF2-1-DF2-48, respectively, and outputted from the output terminals, respectively. Similarly, clock pulses WC3-WC96 are sequentially outputted from the output terminals of the shift register SR, and similar operations described above are performed.

The operation of the flip-flops DF1-1-DF1-48, . . . , DF96-1-DF96-48 is described, using the flip-flops DF1-1-DF96-1 as an example. As shown in FIG. 12, data at the first bit "a1," "a2," . . . , "a96" among the 48-bit digital codes sequentially inputted in the matrix conversion circuit 22*a* are sequentially inputted in the flip-flops DF1-1-DF96-1 in synchronism with the write clock WC (see "Input Data" in FIG. 12). First, when the first data "a1" is inputted in the flip-flops DF1-1-DF96-1, this data is outputted from the output terminal of the flip-flop DF1-1 at the timing of a rising edge of the clock pulse WC1 outputted from the shift register SR (at time t21).

When the next data "a2" is inputted, this data is outputted from the output terminal of the flip-flop DF2-1 at the timing of a rising edge of the clock pulse WC2 outputted from the shift register SR (at time t22). Here, the clock pulse WC1 is not inputted in the clock input terminal of the flip-flop DF1-1 at time t22, the output terminal of the flip-flop DF1-1 continues outputting the data "a 1."

Similarly, data "a3," "a4," . . . , etc. are sequentially inputted, and the clock pulses WC3, WC4, . . . , etc. are outputted from the shirt register SR, whereby the data "a3," "a4,", . . . , etc. are sequentially outputted from the flip-flops DF3-1, DF4-1, . . . , etc. It is noted that, once the clock pulses WC3, WC4, . . . , etc. are inputted in the flip-flops DF3-1, DF4-1, . . . , etc., the flip-flops DF3-1, DF4-1, . . . , etc. continue outputting the data "a3," "a4," . . . , etc.

After the operation described above has been repeated, and when data "a96" is inputted, this data is outputted from the output terminal of the flip-flop DF96-1 at the timing of a rising edge of the clock pulse WC96 outputted from the shift register SR (at time t23). Here, the clock pulses WC1-WC95 are not inputted in the clock input terminals of the flip-flops DF1-1-DF95-1, other than the flip-flop DF96-1, at time t23, the output terminals of the flip-flops DF1-1-DF95-1 continue outputting the data "a1"-"a95," respectively. By this, as shown in FIG. 12, at time t23, the data "a1"-"a96" are outputted from the output terminals of the flip-flops DF1-1-DF96-1, respectively.

The data outputted from the respective output terminals of the flip-flops DF1-1-DF96-1 (data outputted from the output terminals appended with codes d1-1-d96-1) are inputted in the input terminals of the selectors SF1-S1,96 appended with the same codes, respectively, Although the flip-flops DF1-1-DF96-1 are described as an example here, similar operations described above are performed by the other flip-flops DF1-2-DF96-2, . . . , DF1-48-DF96-48.

When the operation described above is completed, the matrix conversion circuit 22*b* is selected as a circuit to convert inputted digital codes, and the matrix conversion circuit 22*a* is put in a non-selected state. Then, the write clock WC is inputted in the matrix conversion circuit 22*b*, and operations similar to the operations of the matrix conversion circuit 22*a* are performed by the matrix conversion circuit 22*b*. In parallel with this, the read operation is performed at the matrix conversion circuit 22*a*.

More specifically, the read clock RC is inputted in the matrix conversion circuit 22*a* that is placed in a non-selected state, whereby the counter CT starts counting. Then, at each of the selectors SL1-SL96, one of the 48 input terminals is selected based on the count signal SC outputted from the counter CT, and data inputted in the selected input terminals are outputted from the output terminals B1-B96 as 96-bit data "b1" (at time t24).

Each time the read clock RC is inputted, a different one of the input terminals is sequentially selected at each of the selectors SL1-SL96, whereby, as shown in FIG. 12, converted 96-bit data "b2," . . . , "b48" are sequentially outputted from the output terminals B1-B96 ("Output Data" in FIG. 12). When the operation described above has been performed for the number of frames (48 times), the matrix conversion circuit 22*a* is again put in a selected state whereby the operation of writing digital codes to the matrix conversion circuit 22*a* is performed, and the matrix conversion circuit 22*b* is put in a non-selected state whereby the operation of outputting 96-bit data from the matrix conversion circuit 22*b* is performed. Thereafter, the selected state and the non-selected state of the matrix conversion circuits 22*a* and 22*b* are alternately switched, and operations similar to those describe above are repeated.

As described above, the matrix conversion circuit shown in FIG. 11 is also capable of a conversion process similar to that of the matrix conversion circuit shown in FIG. 5. Here, in the matrix conversion circuit shown in FIG. 5, the entire shift registers SR1-SR48 are in an operational state while the write clock WC is inputted. In contrast, in the case of the matrix conversion circuit shown in FIG. 11, among the 48×96 flip-flops, only 96 flip-flops in which the clock pulses WC1-WC96 are inputted are placed in an operational state, and the other flip-flops are in a non-operational state. Therefore, the power consumption can be reduced more, compared to the matrix conversion circuit shown in FIG. 5.

More specifically, in the matrix conversion circuit shown in FIG. 5, each of the shift registers SR1-SR48 is equipped with 94 flip-flops, such that the total number of the flip-flops provided in the matrix conversion circuit is 4,680 (96×48). Assuming that the current consumption of each flip-flop is 0.1 mA, as the entire shift registers SR1-SR48 in the matrix circuit shown in FIG. 5 are operated by the write clock WC, the total current consumption is 468.8 mA (4,680×0.1 mA). In contrast, in the matrix conversion circuit shown in FIG. 11, the number of the flip-flops that operate at the same time is 48, and therefore the current consumption is 4.8 mA (48×0.1 mA). In this manner, the matrix conversion circuit shown in FIG. 11 can reduce the power consumption to about one ninetieth (1/90) of that of the matrix conversion circuit shown in FIG. 5.

Electronic Apparatus

Next, examples of electronic apparatuses equipped with the liquid crystal device 1 (an electro-optical device) described above.

Projector

Figure 13:
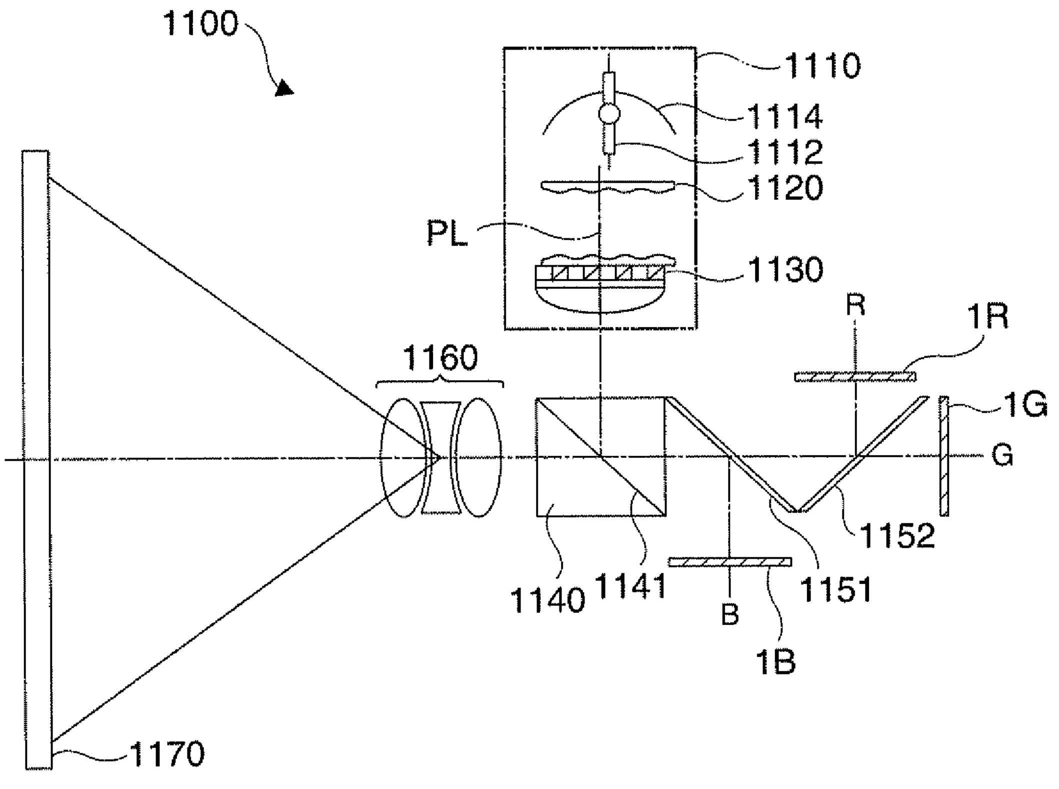
FIG. 13 is a plan view showing a composition of a projector that uses a liquid crystal device.

First, a projector that uses the liquid crystal device 1 according to an embodiment of the invention as a light valve is described. FIG. 13 is a plan view showing the configuration of a projector that uses the liquid crystal device in accordance with the embodiment of the invention. As shown in FIG. 13, inside the projector 1100, a polarized lighting device 1110 is disposed along the optical axis PL of the system. In the polarized lighting device 1110, light emitted from a lamp 1112 becomes light fluxes substantially parallel to one another due to reflection of a reflector 1114, and the light fluxes are incident on a first integrator lens 1120. Accordingly, the light emitted from the lamp 1112 is divided into a plurality of intermediate light fluxes. These divided intermediate light fluxes are converted into one type of polarized light fluxes (s polarized light fluxes) having a substantially constant polarized direction by a polarization conversion element 1130 having a second integrator lens disposed on the light incident side and are emitted from the polarized lighting device 1110.

The s-polarized light fluxes emitted from the polarized lighting device 1110 are reflected by an s-polarized light flux reflecting surface 1141 of a polarization beam splitter 1140. Among these reflected light fluxes, light fluxes of blue light (B) are reflected by a blue light reflecting layer of a dichroic mirror 1151 and are modulated by a reflection-type liquid crystal device 1B. Also, among the light fluxes transmitted through the blue light reflecting layer of the dichroic mirror 1151, light fluxes of red light (R) are reflected by a red light reflecting layer of a dichroic mirror 1152 and are modulated by a reflection-type liquid crystal device 1R. On the other hand, among the light fluxes transmitted through the blue light reflecting layer of the dichroic mirror 1151, light fluxes of green light G are transmitted through the red light reflecting layer of the dichroic mirror 1152 and are modulated by a reflection-type liquid crystal device 1G.

As described above, the light fluxes of the red light, the green light, and the blue light modulated by the liquid crystal devices 1R, 1G, and 1B are sequentially composed by the dichroic mirrors 1152 and 1151 and the polarization beam splitter 1140, and are projected on a screen 1170 by a projection optical system 1160. Since light fluxes corresponding to the primary colors of R, G, and B are incident on the liquid crystal devices 1R, 1B, and 1G by the dichroic mirrors 1151 and 1152, a color filter is not needed. It is noted that, in the above-described example, although a reflection-type liquid crystal device is used, a projector using a transmission display type liquid crystal device may also be configured.

Mobile Computer

Figure 14:
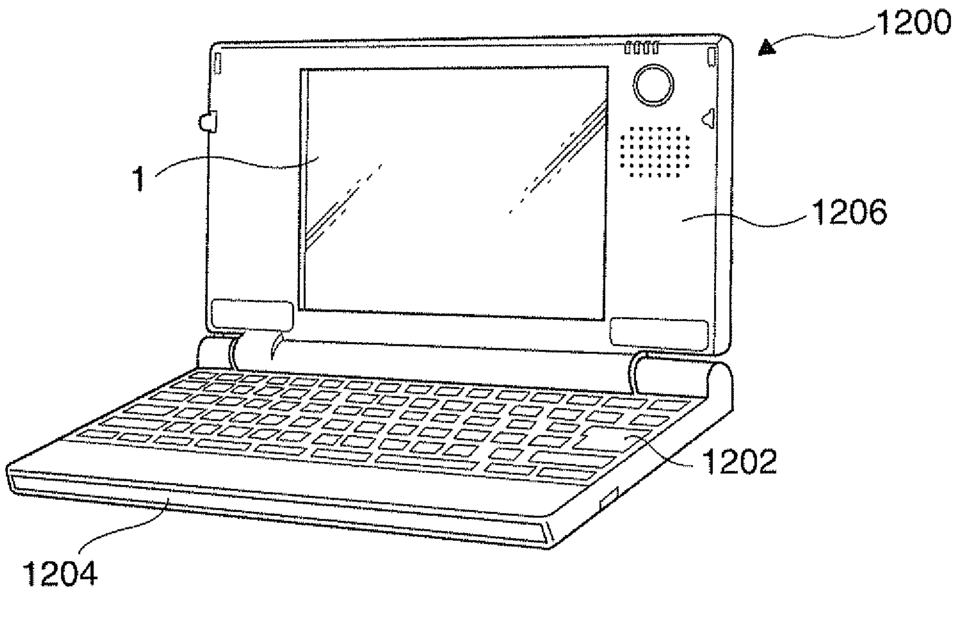
FIG. 14 is a perspective view showing a composition of a personal computer that uses a liquid crystal device.

Next, an example in which the liquid crystal device 1 described above is used for a mobile personal computer will be described. FIG. 14 is a perspective view showing the configuration of a personal computer including a liquid crystal device according to an embodiment of the invention. In FIG. 14, a personal computer 1200 is equipped with a main unit 1204 having a keyboard 1202 and a display unit 1206. This display unit 1206 is configured with a front light added on a front side of the above-described liquid crystal device 1. With this configuration, as the liquid crystal device 1 is used as a reflection direct-view type device, concaves and convexes may preferably be formed in pixel electrodes 16 for scattering reflected light in various directions.

Mobile Telephone

Figure 15:
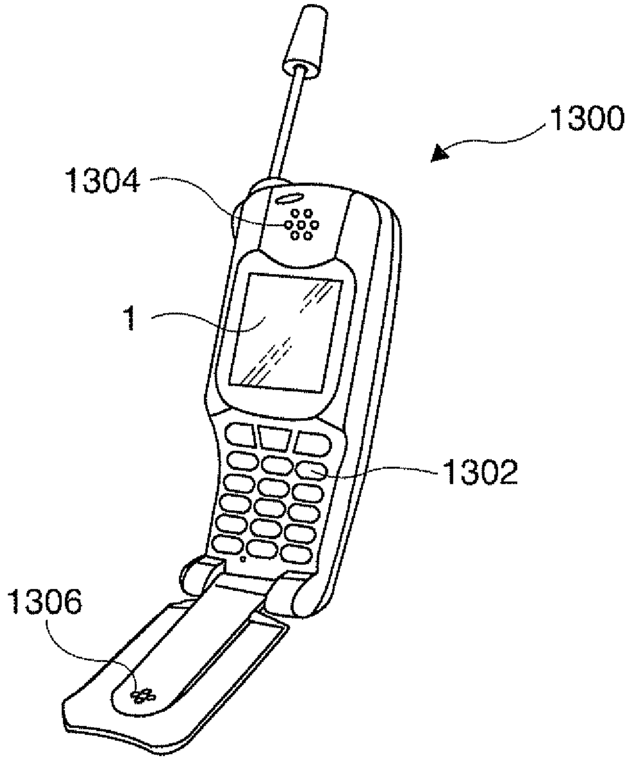
FIG. 15 is a perspective view showing a composition of a portable telephone that uses a liquid crystal device.

Next, an example in which the liquid crystal device 1 described above is used in a mobile telephone is described. FIG. 15 is a perspective view showing the configuration of a portable phone having a liquid crystal device in accordance with an embodiment of the invention. In the figure, the mobile telephone 1300 has the liquid crystal device 1 in addition to a plurality of operation buttons 1302, an earpiece 1304, and a mouthpiece 1306. On the front side of the liquid crystal device 1, a front light is disposed if needed. With this configuration, as the liquid crystal device 1 is used as a reflection direct-view type device, concaves and convexes may preferably be formed in pixel electrodes 118 for scattering reflected light in various directions.

In addition to the devices described with reference to FIGS. 13-15, the invention is also applicable to other electronic devices, such as, for example, a liquid crystal television set, a view finder-type or a monitor direct view-type video cassette recorder, a car navigation system, a pager, an electronic notepad, a calculator, a word processor, a workstation, a video phone, a POS terminal, a device having a touch panel, and the like.

What is claimed is:

1. A display drive circuit that performs digital driving for displaying an image of each one frame based on luminance data of a plurality of subframes, the display drive circuit comprising:

a generation section that generates, based on gradation data, the luminance data having a plurality of bits indicating a luminance level of each of the plurality of subframes:

a conversion section that converts the luminance data into data indicating the luminance level in a number greater than the number of the plurality of subframes; and a storage section that stores the data converted by the conversion section, wherein the conversion section is equipped with a plurality of conversion circuits that alternately perform input of data generated by the generation section and output of converted data, and each conversion circuit includes:

a plurality of shift registers that operate in synchronism with each other, and each having an input terminal in which each bit value of the data generated by the generation section is inputted, and output terminals in a number of bits of data to be outputted;

a plurality of selectors, each having input terminals in the number of bits of data generated by the generation section wherein the input terminals are connected to the output terminals with identical shift stage numbers among the output terminals of the plurality of shift registers, respectively; and a counter that controls data to be selected by the plurality of selectors.

2. A display drive circuit according to claim 1, wherein the generation section is equipped with a nonvolatile memory having addresses corresponding to the gradation data, wherein data stored in storage regions specified by the addresses correspond to data composed of a plurality of bits indicating the luminance level of each of the subframes.

3. A display drive circuit according to claim 1, wherein the conversion section converts data generated by the generation section into data composed of bits indicating the luminance level of the same subframe in the unit of pixels in the number of phase expansion in the arrangement order of the pixels.

4. A display drive circuit according to claim 1, wherein the storage section is equipped with a plurality of storage circuits each capable of storing data for one frame converted by the conversion section.

5. A display drive circuit according to claim 4, comprising a write control section that writes data outputted from the conversion circuit to the storage section in synchronism with a dot clock that is a unit for driving the pixels.

6. An electro-optical device having pixels having switching elements provided according to intersections between a plurality of scanning lines and a plurality of data lines, and pixel electrodes connected to the switching elements, the electro-optical device comprising the display drive circuit recited in claim 1 that drives the pixels based on data stored in the storage section.

7. An electronic apparatus comprising the electro-optical device recited in claim 6.

* * * * *